(12) United States Patent
Kallurwar et al.

(10) Patent No.: US 8,695,940 B2
(45) Date of Patent: Apr. 15, 2014

(54) MOUNTING INTERFACE FOR A HOUSING OF A FILTRATION MODULE

(75) Inventors: Rahul B. Kallurwar, Cookeville, TN (US); Kevin C. South, Cookeville, TN (US); Charles W. Hawkins, Sparta, TN (US); Ismail C. Bagci, Cookeville, TN (US); Philip S. Hall, Cookeville, TN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 390 days.

(21) Appl. No.: 12/832,149

(22) Filed: Jul. 8, 2010

(65) Prior Publication Data

US 2011/0006646 A1 Jan. 13, 2011

Related U.S. Application Data

(60) Provisional application No. 61/224,289, filed on Jul. 9, 2009.

(51) Int. Cl.
*F16M 11/00* (2006.01)

(52) U.S. Cl.
USPC ... 248/682; 248/200; 248/220.21; 248/311.2; 210/459

(58) Field of Classification Search
CPC ........ F16M 13/02; F16M 13/00; A47B 81/00
USPC ......... 248/682, 74.2, 74.3, 315, 311.2, 312.1, 248/220, 220.21; 210/249, 232, 418, 234, 210/238, 443, 459
See application file for complete search history.

(56) References Cited

U.S. PATENT DOCUMENTS

| | | | | |
|---|---|---|---|---|
| 2,277,738 A | * | 3/1942 | Wilkinson | 210/249 |
| 2,354,238 A | * | 7/1944 | Wilkinson | 184/6.24 |
| 2,589,920 A | * | 3/1952 | Beckett | 210/130 |
| 4,676,467 A | * | 6/1987 | Palsulich | 248/221.11 |
| 4,956,081 A | * | 9/1990 | Hodgkins et al. | 210/136 |
| 5,044,526 A | * | 9/1991 | Sasaki et al. | 222/377 |
| 5,121,894 A | * | 6/1992 | Twork et al. | 248/316.7 |
| 5,435,511 A | * | 7/1995 | Hsu | 248/206.3 |
| 5,474,676 A | * | 12/1995 | Janik et al. | 210/249 |
| 5,759,392 A | * | 6/1998 | Okabe et al. | 210/232 |
| 5,921,520 A | * | 7/1999 | Wisniewski | 248/316.1 |
| 6,793,818 B1 | * | 9/2004 | Entringer et al. | 210/238 |
| 7,578,932 B2 | * | 8/2009 | Cantolino | 210/124 |
| 7,815,054 B2 | * | 10/2010 | Klein et al. | 210/418 |
| 7,918,204 B2 | * | 4/2011 | Gignac et al. | 123/195 A |
| 8,043,503 B2 | * | 10/2011 | Clausen | 210/236 |

FOREIGN PATENT DOCUMENTS

CN 1302940 C 3/2007

* cited by examiner

*Primary Examiner* — Terrell McKinnon
*Assistant Examiner* — Monica Millner
(74) *Attorney, Agent, or Firm* — Foley & Lardner LLP

(57) ABSTRACT

A mounting assembly is described that has an interface designed to increase the stress margin of at least the module side of the assembly, for example in a liquid filtration module, and to increase ease of assembling its mounting components. The interface reduces the failure of the mounting assembly at least on the module side, so that if failure of the mounting assembly occurs, such an occurrence is less likely to be at the interface and on the module side, thereby reducing the need to replace more complex and expensive components that may be on the module side. Generally, the mounting assembly includes a mounting interface and a mounting bracket connectable to the mounting interface. A retention component is configured to maintain connection of the mounting interface to the mounting bracket.

9 Claims, 28 Drawing Sheets

MOUNTING INTERFACE FOR A HOUSING OF A FILTRATION MODULE

This application claims the benefit of U.S. Provisional Application No. 61/224,289, filed on Jul. 9, 2009, and titled MOUNTING INTERFACE FOR A HOUSING OF A FILTRATION MODULE, and which is herewith incorporated by reference in its entirety.

FIELD

This disclosure generally pertains to the field of filtration, and more particularly to a mounting interface for a filter housing.

BACKGROUND

Mounting configurations for filtration modules are known, such as those employed on an outer housing of a filter, for example a housing of a fuel filter as used in a vehicle. Such mounting configurations employed on fuel filter housings, for example, have included a mounting member on the housing that connects to another mounting member, such as a bracket for mounting to another structure (e.g. a vehicle body). Previous designs of such mounting configurations have had various assembly constraints, for example, allowing only vertical sliding between the mounting members to connect the members in similar or other instances, the bracket is stronger than the mounting member on the housing, where over time the housing, and sometimes the entire filtration module assembly, will need replacement before the bracket.

Improvements may be made upon existing mounting configurations, such as for filtration modules, such improvements that may be made include, for example, the overall durability of the mounting portion on a filter housing and ease of assembly of the overall mounting components.

SUMMARY

Generally, a mounting assembly is described that has an interface designed to increase the stress margin of the module side of the assembly and improving tolerance, for example a filtration module, and to increase ease of assembling its mounting components. The interface is structured and arranged to reduce the failure of the mounting assembly at least on the module side. That is, if failure of the mounting assembly occurs, such an occurrence is less likely to be on the module side, thereby reducing the need to replace more complex and expensive components that may be on the module side.

In one embodiment, a mounting assembly includes a mounting interface having a protruding portion. A mounting bracket is connectable to the mounting interface, where the mounting bracket having a plate structure with an open area. The open area is receivable of the protruding portion and is dimensioned and sized so as to mate with a dimension of the protruding portion. A retention component is configured to maintain connection of the mounting interface and the mounting bracket. The retention component retains the protruding portion within the open area in a mating engagement.

In one embodiment, the mounting interface has a configuration, and may also be constructed of a material having a higher stress margin than the mounting bracket.

8I is a perspective view of the retention component alone.

Figure 8A:
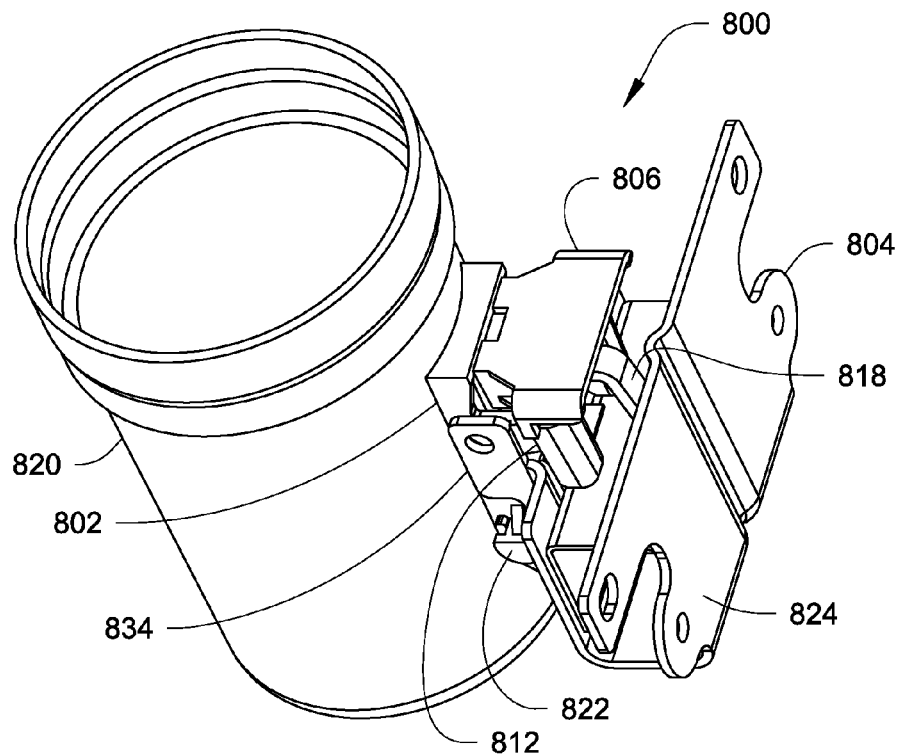
FIG. 8A is a perspective view of another embodiment for a mounting interface on a filtration housing and showing the mounting interface connected to a mounting bracket with a retention component.
Figure 8B:
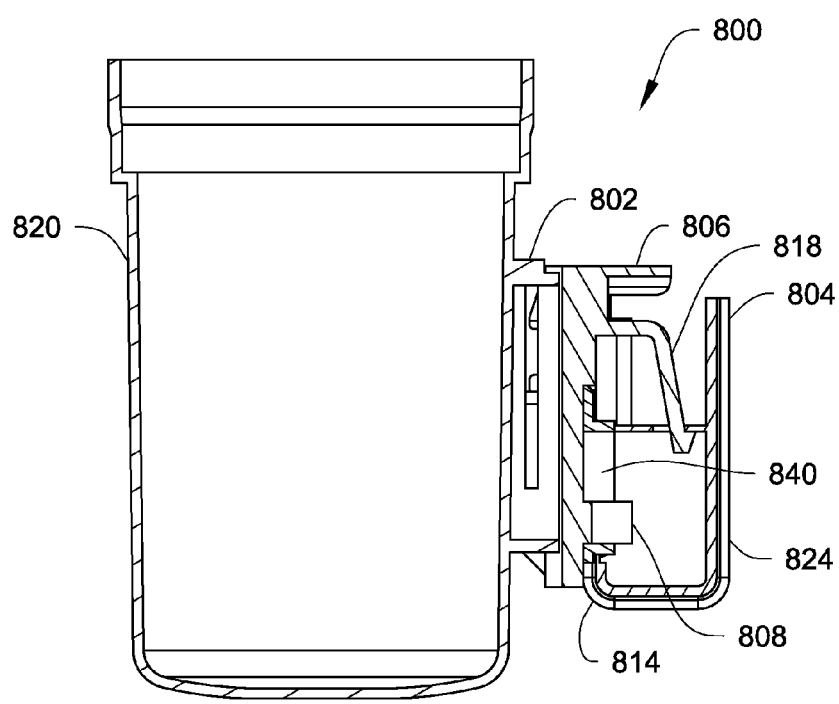
FIG. 8B is a side sectional view of the mounting interface, mounting bracket, and retention component of FIG. 8A.
Figure 8C:
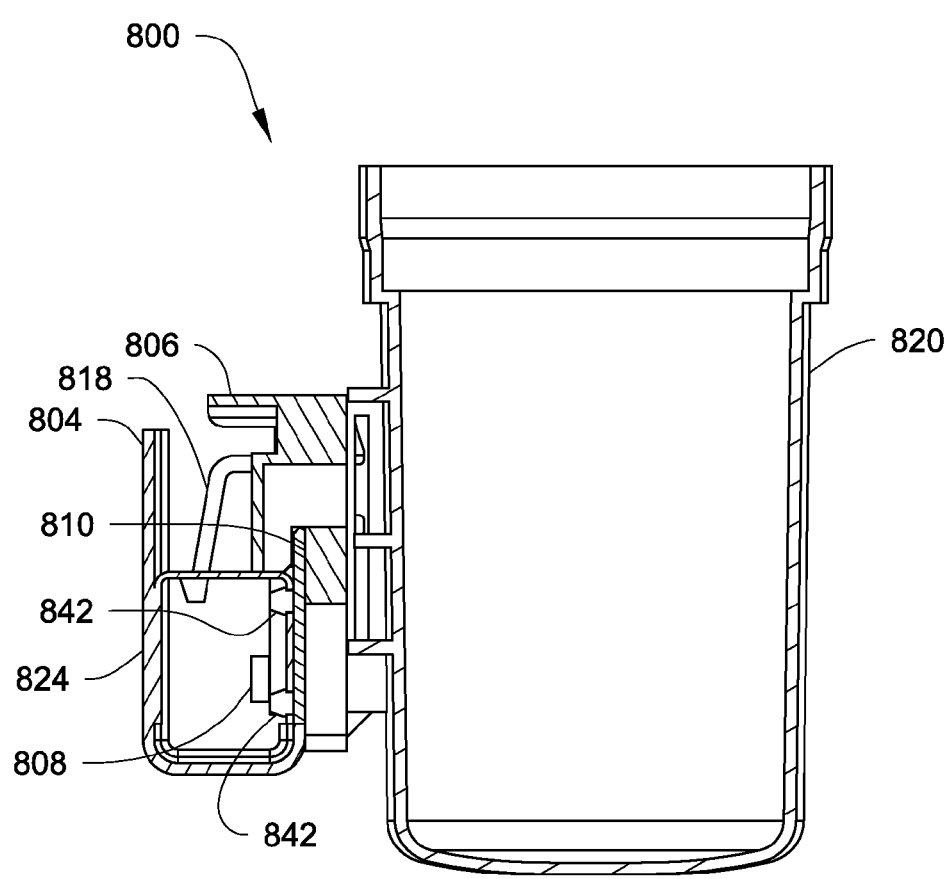
FIG. 8C is another side sectional view of the mounting interface, mounting bracket, and retention component of FIG. 8A.
Figure 8D:
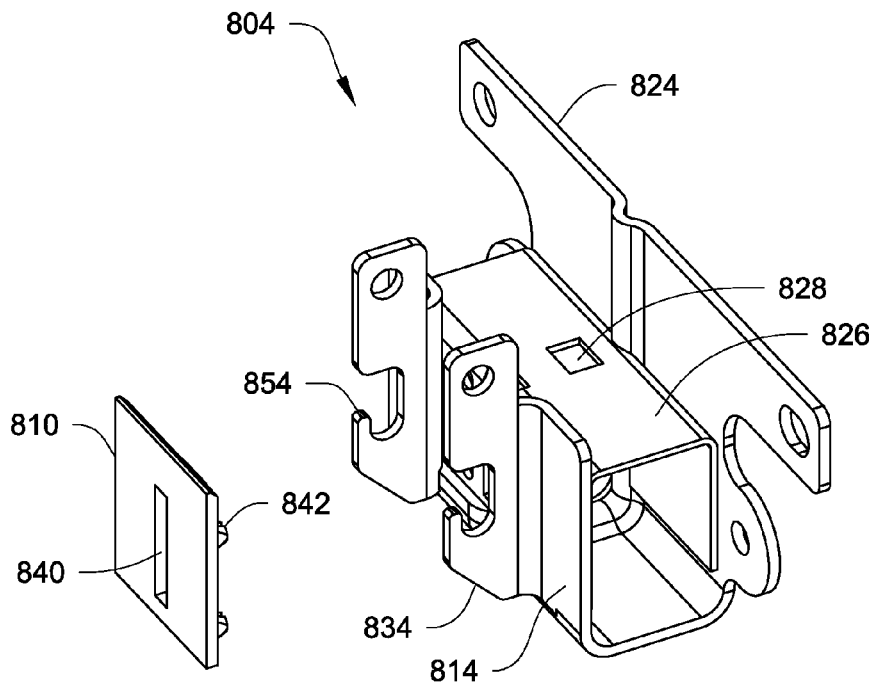
FIG. 8D is a perspective view of the mounting bracket alone.
Figure 8E:
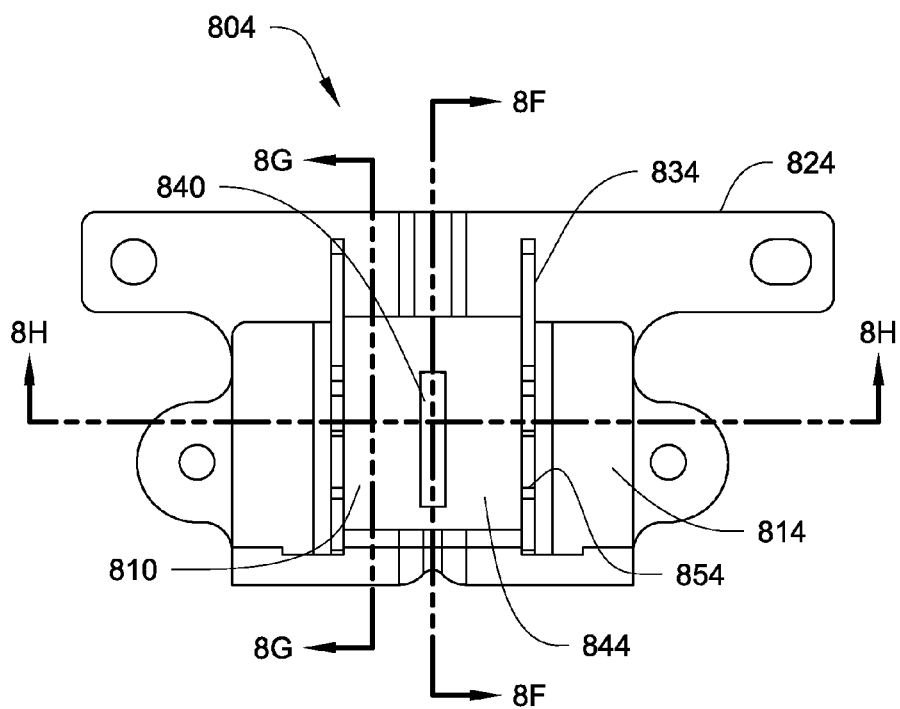
FIG. 8E is a front view of the mounting bracket alone.
Figure 8F:
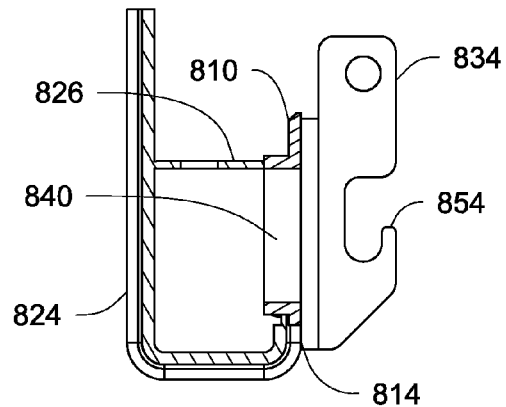
FIG. 8F is a side sectional view of the mounting bracket alone.
Figure 8G:
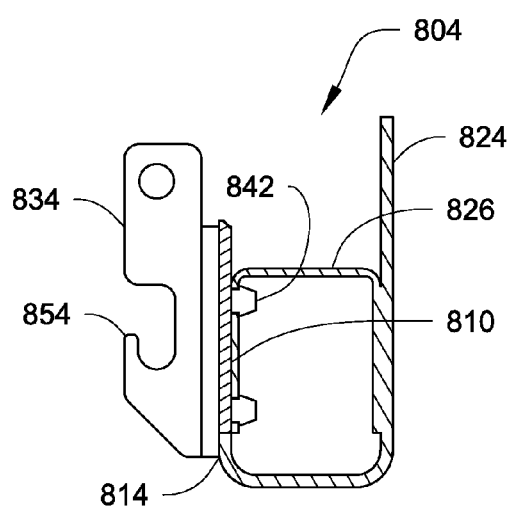
FIG. 8G is another side sectional view of the mounting bracket alone.
Figure 8H:
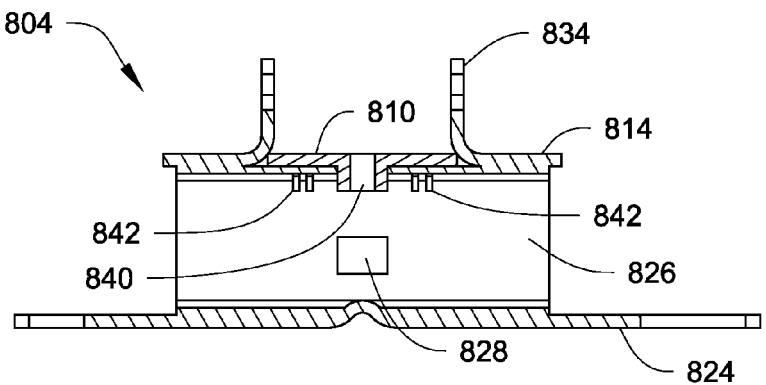
FIG. 8H bottom sectional view of the mounting bracket alone.
Figure 8I:
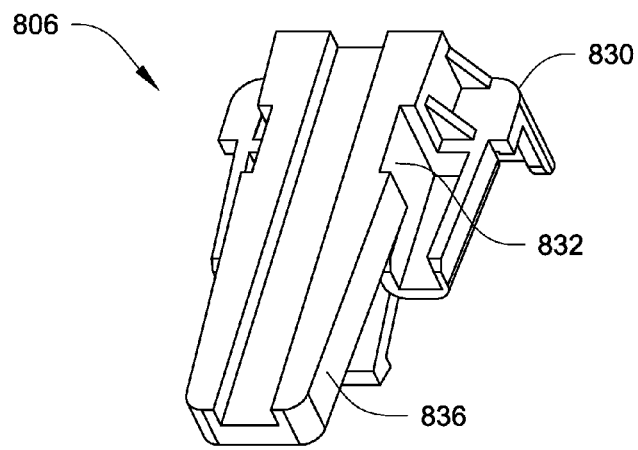
Figure 8J:
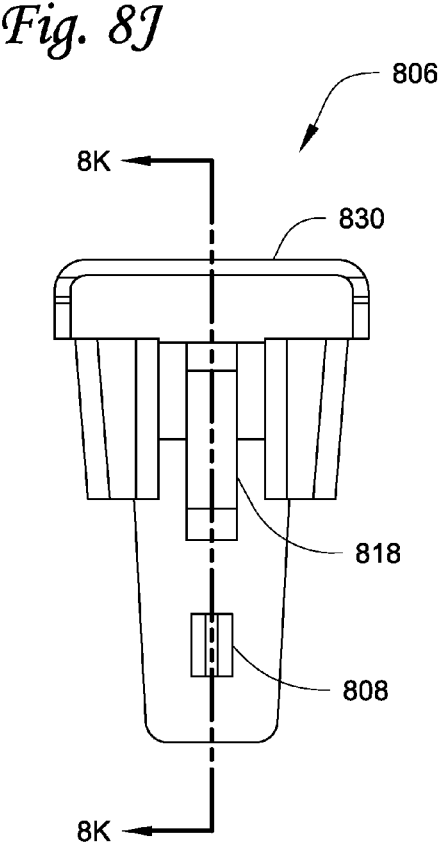

FIG. 8J is a side view of the retention component alone.

Figure 8K:
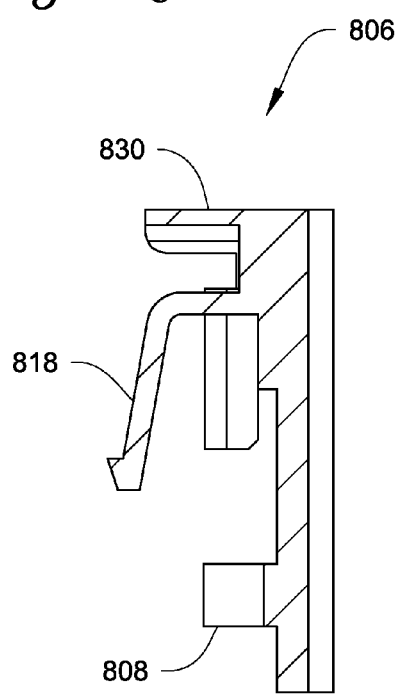

FIG. 8K is another side view of the retention component alone.

FIGS. 8L-8O shows a process of uninstalling part of a filtration module using the mounting interface, mounting bracket, and retention component.

Figure 9A:
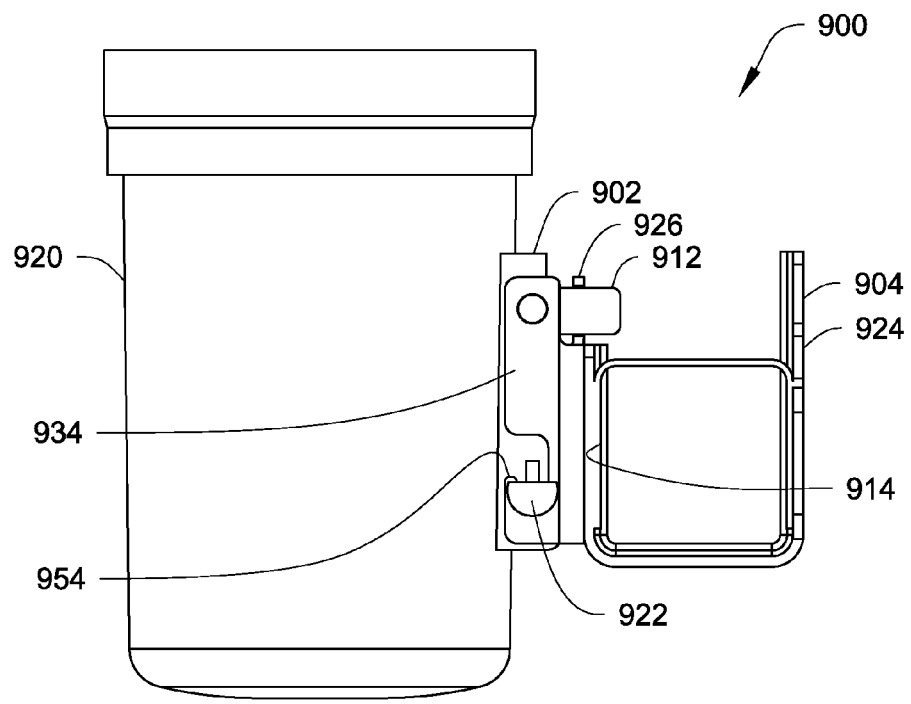

FIG. 9A is a side view of another embodiment for a mounting interface on a filtration housing and showing the mounting interface connected to a mounting bracket.

Figure 9B:
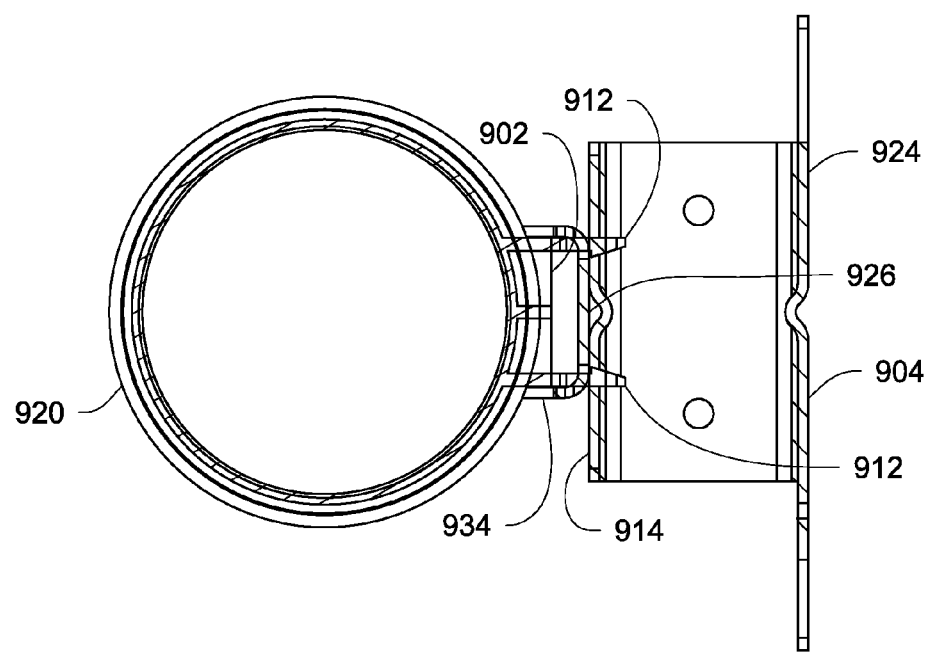

FIG. 9B is a top sectional view of the mounting interface connected to the mounting bracket of FIG. 9A.

Figure 9C:
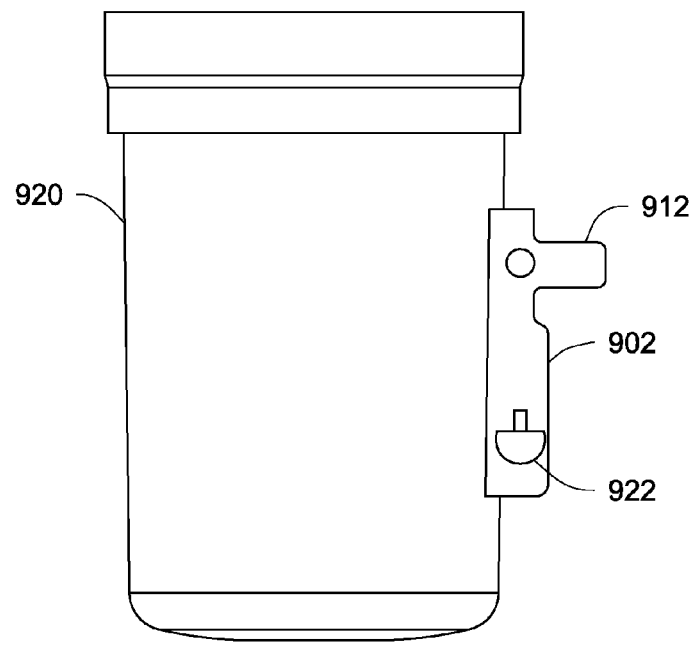

FIG. 9C is a side view of the mounting interface on a filtration housing alone.

Figure 9D:
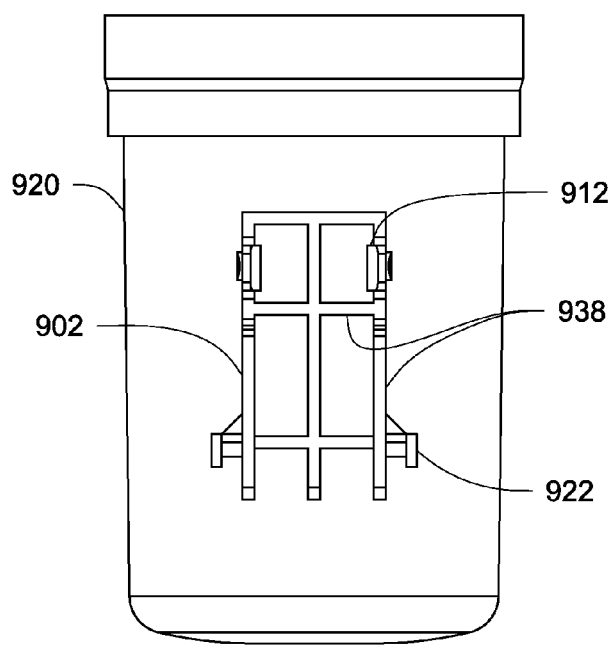

FIG. 9D is a front view of the mounting interface on a filtration housing alone.

Figure 9E:
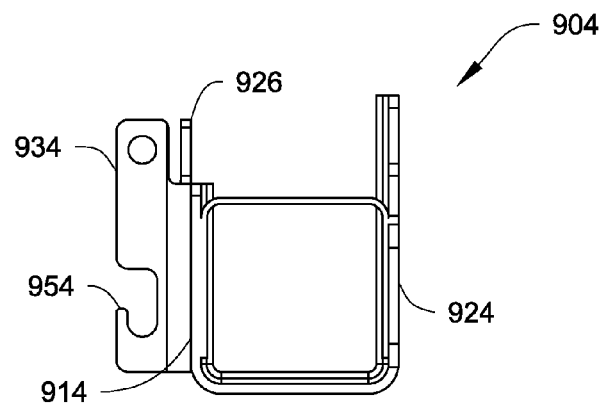

FIG. 9E is a side view of the mounting bracket alone.

Figure 9F:
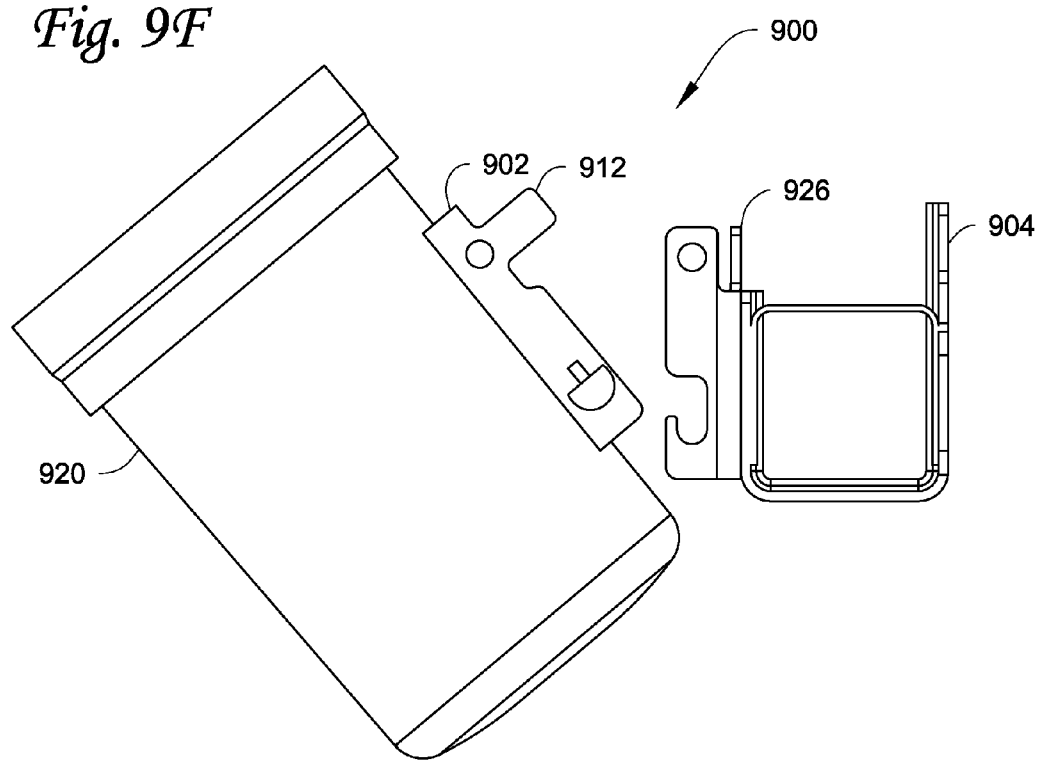

FIG. 9F is a side view of the mounting interface on a filtration housing just before mounting to the mounting bracket.

Figure 9G:
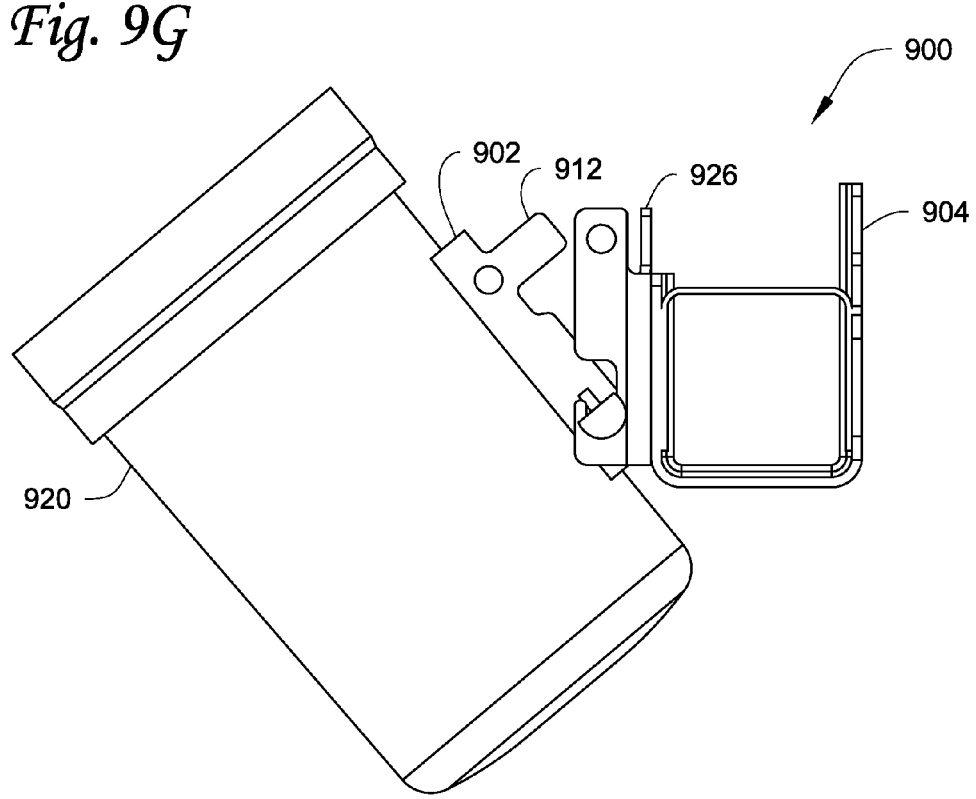

FIG. 9G is a side view of the mounting interface on a filtration housing partially mounted to the mounting bracket.

Figure 9H:
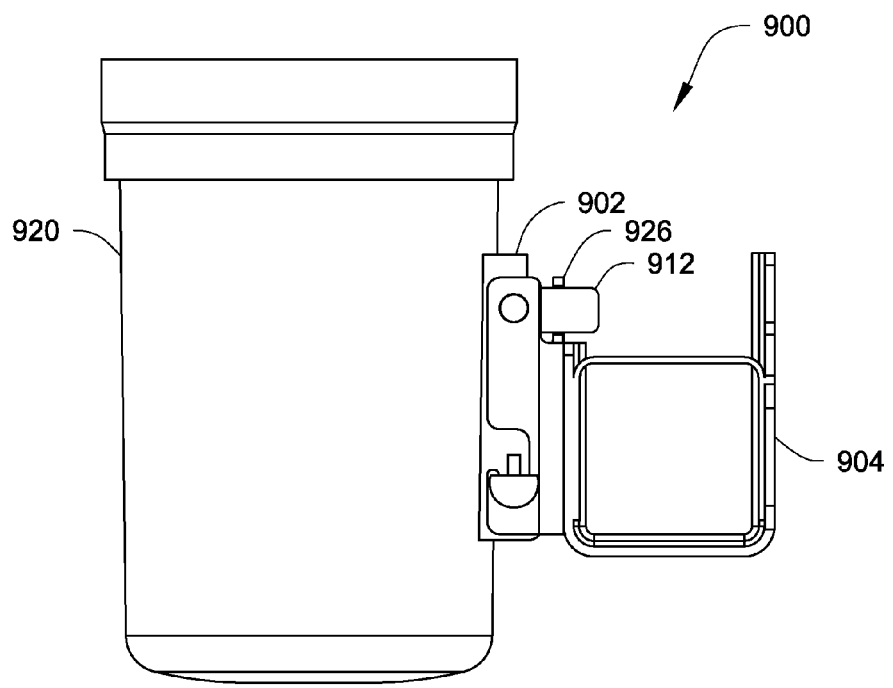

FIG. 9H is a side view of the mounting interface on a filtration housing mounted to the mounting bracket.

DETAILED DESCRIPTION

The following description refers to the above drawings on various embodiments of a mounting assembly. Generally, a mounting assembly described herein has an interface designed with improved stress margin and with overall ease of assembly. The interface has a structure that can reduce the failure of the mounting assembly at least on its module side, so that if failure occurs, it is less likely to be on the module side, thereby reducing the need to replace more complex and expensive components that may be on the module side. A mounting assembly herein is shown and described as being used, for example, with outer shells or housings of liquid filtration modules such as, but not limited to, a housing of a fuel filter. In appropriate circumstances, it is to be realized that the concepts herein can be applied to other module applications. For example, the mounting constructions herein can be used for various filter designs, including for instance wholly or partly disposable filters, which may not employ the shell and cartridge designs of the drawings. Likewise, the mounting constructions herein may be applied to applications that do not include filtration modules.

Figure 1A:
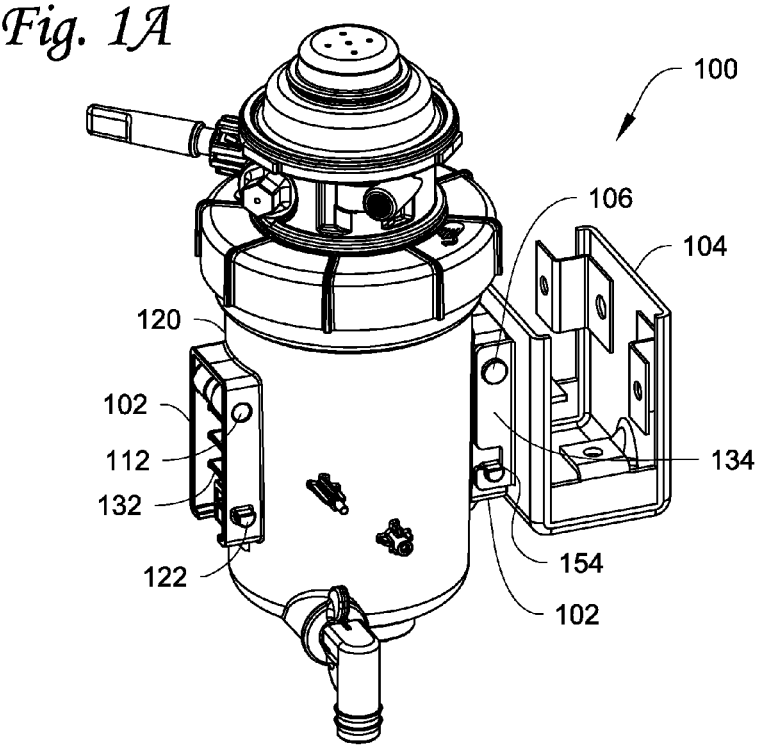
FIG. 1A is a perspective view of one embodiment for a mounting interface on a filtration housing showing the mounting interface on a filtration module and connected to a mounting bracket.
Figure 1B:
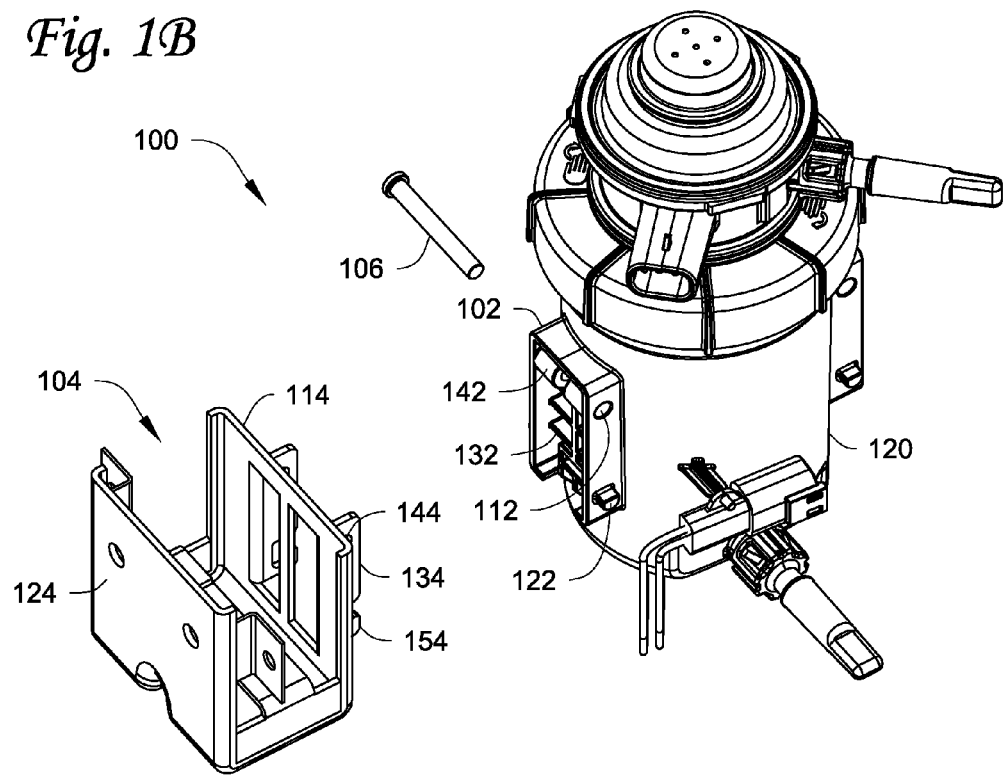
FIG. 1B is a perspective exploded view of the mounting interface of FIG. 1A, the mounting bracket, and retention component.
Figure 1C:
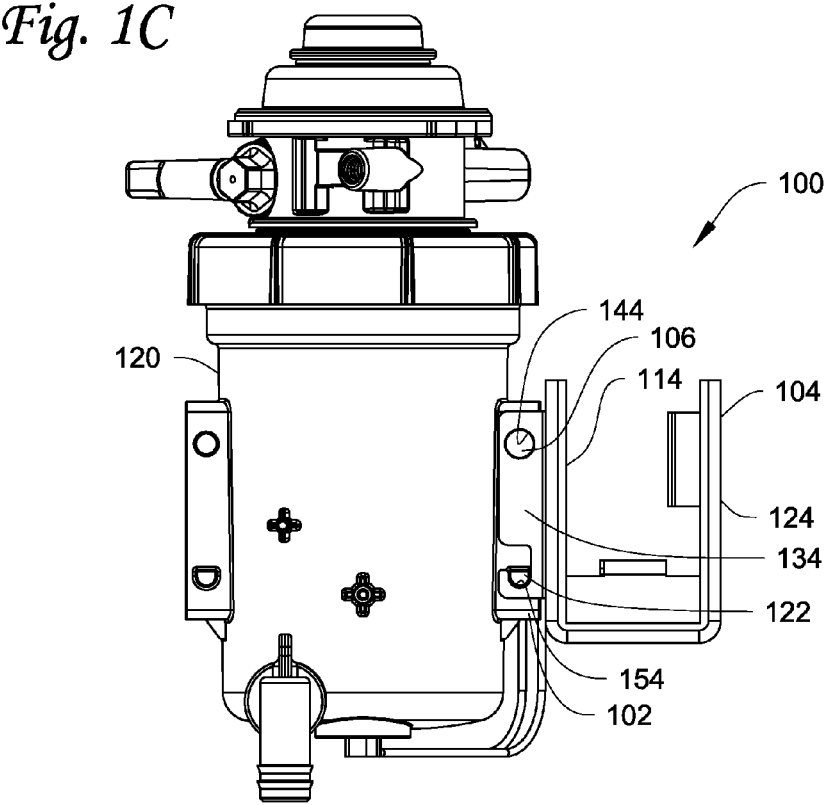
FIG. 1C is a side view of the mounting interface of FIG. 1A showing the mounting interface connected with the mounting bracket.

With reference to FIGS. 1A-1C, a mounting assembly 100 according to one embodiment is illustrated. In the embodiment shown, the mounting assembly 100 includes a mounting interface 102 constructed and arranged as a protruding portion. As shown, the mounting interface 102 is disposed about an outer housing or shell 120 of a filtration module, such as a fuel filter. As one preferred example, the mounting interface 102 is integrally molded with the housing 120 structure, which can be a composite material. If appropriate, it will be appreciated that the mounting interface 102 may not be integrally molded but separately attached to the housing 120.

With reference to the housing 120, the housing as shown includes, for example, a wall structure having a generally cylindrical sidewall, a bottom wall, and a generally open top. The housing 120 has an inner volume within the wall structure. The inner volume is configured in some examples to accommodate a filter or filter cartridge and allow insertion of a filter or filter cartridge through the open top.

A mounting bracket 104 is connectable to the mounting interface 102. As in the embodiment shown, the mounting bracket 104 is a u-shaped bracket with one plate 114 that faces the mounting interface 102 and another plate 124 connectable to another equipment, for example a vehicle body. It will be appreciated that the mounting bracket 104, where appropriate, can be other shapes and configurations than the u-shaped bracket shown and, where appropriate, the equipment to which the plate 124 can be connected may be a body other than a vehicle body.

With further reference to the mounting bracket 104, the plate structure 114 on the side that connects with the mounting interface 102 is constructed and arranged to have an open area (further described below). Generally, the open area is receivable of the protruding portion of the mounting interface 102. The open area is dimensioned and sized so as to mate with a dimension of the protruding portion.

The assembly 100 further includes a retention component 106 configured to maintain connection of the mounting interface 102 to the mounting bracket 104. The retention component 106 retains the protruding portion of the mounting interface 102 within the open area of the mounting bracket 104 in a mating engagement.

In one embodiment, the mounting interface 102 has a particular reinforced configuration, and may also be constructed of a material having a higher stress margin than the mounting bracket 104 (further described below). For example, the mounting interface 102 in some embodiments can be a composite material structured to have a higher stress margin than the mounting bracket 104 which may be metal.

With further reference to the mounting interface 102, the protruding portion in some embodiments has a generally rectangular shaped rim constructed of vertical and horizontal walls. The specific rectangular shape shown in all of the drawings is intended to be exemplary only. It will be appreciated that the specific shape may be modified as desired and/or necessary. It will also be appreciated that the mounting interface in this or any of the following embodiments may be shapes other than rectangular. For example, the mounting interface herein can be other shapes, such as but is not limited to, general parallelepipeds, trapezoidal, triangular, or circular.

As described, the mounting interface 102 can be an integral part of a housing filtration module (e.g. 102 and 120 formed from one mold), and can be designed for quick installation and release. The mounting interface 102 and the housing 120 when formed from the same mold, can be constructed of a composite material, for example 33% GF Nylon. It will be appreciated that functionally equivalent composite materials other than 33% GF Nylon may be employed or, as appropriate, materials which may or may not be a composite material may also be employed. As shown in FIGS. 1A-C, the mounting interface 102 provides a robust structure through which part of the filtration module (e.g. outer housing of the filter) can be connected and secured with the mounting bracket 104 in a desired application.

With further reference to the mounting interface 102, the protruding portion generally includes vertical walls with mounting features 112, 122 that engage with the mounting bracket 104. In the embodiment shown, one mounting feature 112, for example is one or more through holes extending through the vertical walls. In some embodiments, the through holes 112 for example are cylindrical. As shown, the two through holes 112 are aligned to allow the retention component 106 to be inserted therethrough. The number of through holes can vary for example with the number of vertical walls present within the protruding portion of the interface 102.

The other mounting feature 122 in the exemplary embodiment shown is one or more rests that extend outward from the vertical walls of the protruding portion of interface 102. The rests 122 can be constructed as posts configured to allow resting on a corresponding mounting future of the mounting bracket 104 (see below). In some embodiments, the rests 122 can be an extruded member, and is molded along with the mounting interface 102, and of similar material. As shown, the rests 122 in some instances is a semi-circular shaped extrusion with a generally flat upper and curved under, which can allow pivot action to maneuver and align connection of the interface 102 with the mounting bracket 104.

With further reference to the mounting feature 122, the rests can also restrict or at least reduce movement of the composite liquid filtration module during operation.

As further shown, the mounting features 112, 122 are respectively disposed towards the top and bottom of the interface 102. It will be appreciated that this specific configuration is not meant to be limiting and the mounting features 112, 122 can be switched if desired, or otherwise be located on the interface 102 as appropriate.

The interface 102 also includes reinforcing members 132, 142. As shown, the reinforcing members are disposed within the vertical and horizontal walls of the protruding portion. Reinforcing members 132 in some instances are vertical and horizontal ribs between the inner rim of the outer vertical and horizontal wall structure of the protruding portion. The reinforcing members 132 add stiffness to the overall structure of the interface 102. In some embodiments, the reinforcing members 132 can be approximately 0.8 times the thickness of the outer vertical and horizontal walls of the protruding portion structure of the interface 102. The reinforcing member 142 in some embodiments is a thickened wall around through holes 112. In some embodiments, the width of the thickened portions from side to side (vertical wall to vertical wall) is approximately 4.5 times the thickness of the outer vertical and horizontal walls of the protruding portion. The reinforcing members 132, 142 can also be constructed of a mold material, for example molded along with the entire interface 102, and also helps to provide a stronger assembly structure with increased stress margins on the module side (e.g. stronger than a mating metal bracket).

With reference to the equipment side of the mounting assembly 100, the mounting bracket 104 can be constructed of a metal or composite material. In many instances, the mounting bracket 104 is metal, such as cold rolled mild steel, and in some embodiments is constructed of material that has a lower stress margin than the interface 102.

As shown, the mounting bracket 104 is a u-shaped bracket with the plate 114 that faces the interface 102 at the module side and with the plate 124 configured to connect to a body of another equipment (e.g. vehicle body). With further reference to the open area that receives the protruding portion of the mounting interface 102, the open area in this embodiment is designed by two mount members 134 spaced apart to receive the mounting interface 102, so as to mount the housing 120 of the filtration module to the bracket 104. As shown, the mounting interface 102 is placed between the mount members 134 during operation. In some embodiments, the mount members 134 are vertically configured so that the open area is dimensioned and sized to mate with a dimension of the protruding portion. Still in some embodiments, the open area between the mount members 134 can have a slightly larger dimension than the interface 102 to give a somewhat snug fit before the retention component 106 is assembled.

As with the interface 102, the mounting bracket 104 also has two mounting features 144, 154 that engage and correspond with the mounting features 112, 122 of the interface, and which help to secure the interface 102 (and housing 120) in position.

In the example shown, the mounting feature 144 is a pair of through holes designed to align with the corresponding feature 112 (through holes) of the interface 102.

The mounting feature 154, in the embodiment shown, are catch members such as, but not limited to, angular hook shaped features, which support the mounting feature 122 (e.g. rests) of the interface 102. The catch members also have some clearance space that helps to allow pivoting and alignment of the through holes 112, 144. In some embodiments, the catch members can also be designed with an inner angle based on requirement and space available on the application. For example, the outer portion of the hook that is distal from the bracket 104 can angle towards the bracket 104, rather than generally upright (as shown). The catch members also restrict or at least limit movement of the interface 102 (and housing 120) during operation.

As further shown, the mounting features 144, 154 are respectively disposed towards the top and bottom of the vertical mount members 134. It will be appreciated that this specific configuration is not meant to be limiting. As with mounting features 112, 122, mounting features 144, 154 can be switched if desired, or otherwise be located on the bracket 104 as appropriate for engaging with interface 102.

With reference to the retention component 106, the retention component 106 in some embodiments is a pin. The pin can be constructed of a metal or a non metal material, such as a composite material. The pin slides and is insertable through the mounting features 112, 144 (through holes), when they are aligned, to secure the interface (and housing 120) to the mounting bracket 104. As shown, the retention component 106 can be a circular straight pin with a head on one side, and may be made up of cold rolled mild steel. If needed, the pin can be secured and retained with the help of a star-washer, retainer ring, or cotter pin as may be known in the art.

With reference to its assembly, attachment of the interface 102 and bracket 104 creates a mounting junction between the interface 102 (e.g. and housing 120 of the filtration module) and the bracket 104. The installation procedure of the assembly includes sliding the interface 102 at an angle relative to the bracket 104, and resting the mounting features 122 (e.g. rests) on mounting features 154 (e.g. hook shaped catch members) of the bracket 104. The mounting interface 102 is allowed to pivot within catch member (e.g. the hook shaped feature) and allows movement to align the through holes 112 of the mounting interface 102 with the through holes 144 of the mounting bracket 104. To secure the assembly, the retention component (e.g. pin) is inserted through the holes 112, 144 of the mounting interface and mounting bracket. After pivoting the interface, for example, the holes align so that the retention component can slide through to secure the components together in place.

The assembly 100 described provide, among other features, an improved quick release mounting interface 102 with a more robust structure at least for the module side. As some examples, the molded extrusions of the interface 102 such as the rests 122 can eliminate the need for added components such as a second pin or fastener.

Other differences of the assembly described herein from previous interfaces also include that the interface and filtration module, during mounting, can slide at an angle relative to the bracket and allow for pivoting and alignment to put it into place.

The relative design of the interface 102 and bracket 104 in some embodiments is such that the bracket 104 would fail before the mounting interface 102, so that replacement of the more expensive housing 120 and other module side components can be avoided. That is, the bracket 104 usually is cheaper to replace than the interface 102 and housing 120. The improved reinforcement and robustness of the interface 102 also can ensure that the closed filtration module is not compromised, for example, during vehicle impact.

With further reference to the relative design of the interface 102 and bracket 104, the bracket 104 which can be a metal that is weaker than the composite interface 102 and housing 120 or pin 106. As described, the bracket 104 would fail first, if at all, and is easier and cheaper to replace.

To further this concept, a ratio of modulus among the materials for the mounting interface and bracket can be modified to achieve the relative strength of the components. For example, the materials for the interface 102 and bracket 104 may be selected with a certain ratio of modulus or Young's modulus, for example where the stiffness of the interface 102 is greater than at least part of the bracket 104. For example, the mounting interface 102 and housing 120 can include a glass fiber material (or glass filled material) and Nylon material at 33%, and the mounting bracket can be metal.

Additionally, the design or stress margins of the mounting interface and bracket can be modified. For example, the bracket 104 is designed to have a lower design margin compared to the interface 102 and the pin 106. Such a configuration also can help insure that certain portions of the bracket 104 would fail, if at all, before the interface 102, so that the housing 120 of the filtration module and its components (e.g. the filter, a heater, water-in-fuel sensor, and/or pump) are not compromised, for example during vehicle impact. That is, the assembly 100 also can be constructed with certain design margins to achieve the relative stiffness/robustness of the interface 102 and the bracket 104.

Additionally, the design margins of the mounting interface 102, bracket 104 and pin 106 can be modified. For example, the pin 106 is designed to have a lower design margin compared to the interface 102 and the bracket 104. Such a configuration will insure that the pin 106 would fail before the interface 102 or bracket 104, so that the housing 120 of the filtration module and its components (e.g. the filter, a heater, water-in-fuel sensor, and/or pump) are not compromised, for example during vehicle impact. That is, the assembly 100 also can be constructed with certain design margins to achieve the relative stiffness/robustness of the interface 102 and the bracket 104.

What is meant by 'design margin' is with regard to a generally known factor of safety, which is determined by the ratio of maximum allowable stress (derived from properties of the material) to the working stress for the component loading on component) or, in other words, the maximum stress of the material to the maximum stress loading on the component. For example, the bracket 104 is designed to have a lower design margin compared to the interface 102 and the pin. Such a configuration also can help insure that the bracket 104 would fail before the interface 102 so that the housing 120 of the filtration module and its components (e.g. the filter, a heater, water-in-fuel sensor, and/or pump) are not compromised, for example during vehicle impact.

As one example of testing conducted on the design margins, reports show that the minimum margin is approximately 1.38 for a steel bracket as constructed herein, where bending occurs earlier than for a composite interface and housing having a design margin of approximately 6.0. While the life cycle for metals, such as steel, may be infinite, final element analysis has identified that the holes 144 of the bracket 104 are a weaker point than the interface 102 structures. As shown in FIGS. 1A-C, for example, the mount members 134 at the holes 144 would have the weakest area per final element analysis. In the event of failure, replacement of bracket may be needed, but the interface and housing would withstand higher stresses.

In accordance with many if not all of the concepts described above, additional embodiments of the mounting assembly are illustrated in FIGS. 2A to 9H that can enjoy similar benefits. As with the general embodiment of FIGS. 1A-C, each of the following alternative embodiments generally includes a mounting interface, mounting bracket, and retention component. Similar materials and design considerations as described above can be applied to the following concepts where appropriate and, where similar structures are shown in FIGS. 2A-9H, the above descriptions also can be applied if appropriate.

FIGS. 2A-2C

Figure 2A:
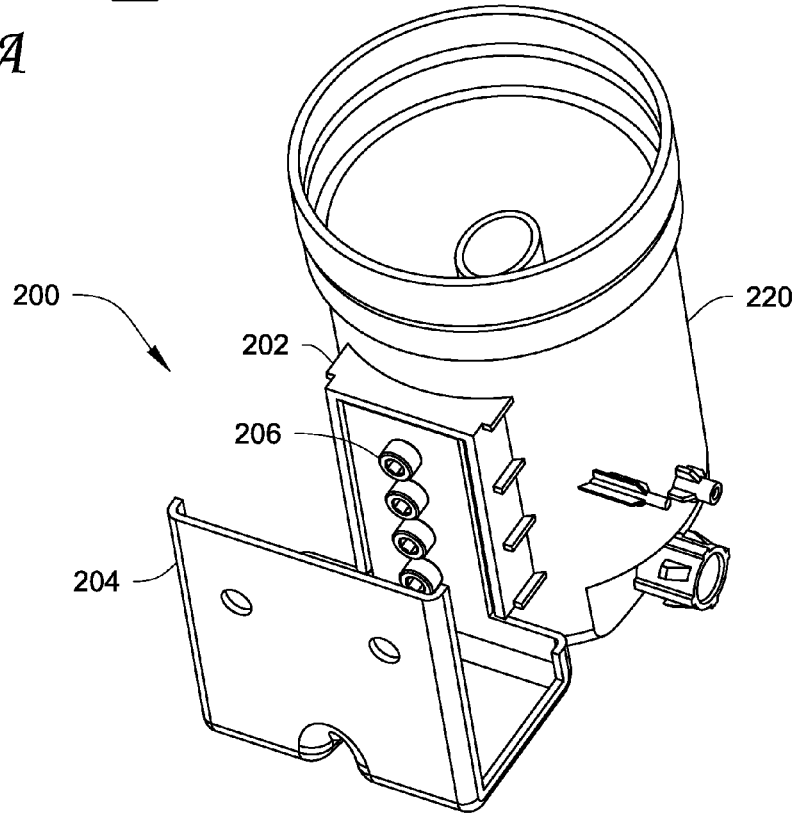
FIG. 2A is a perspective view of another embodiment for a mounting interface on a filtration housing and showing the mounting interface connected to a mounting bracket.
Figure 2B:
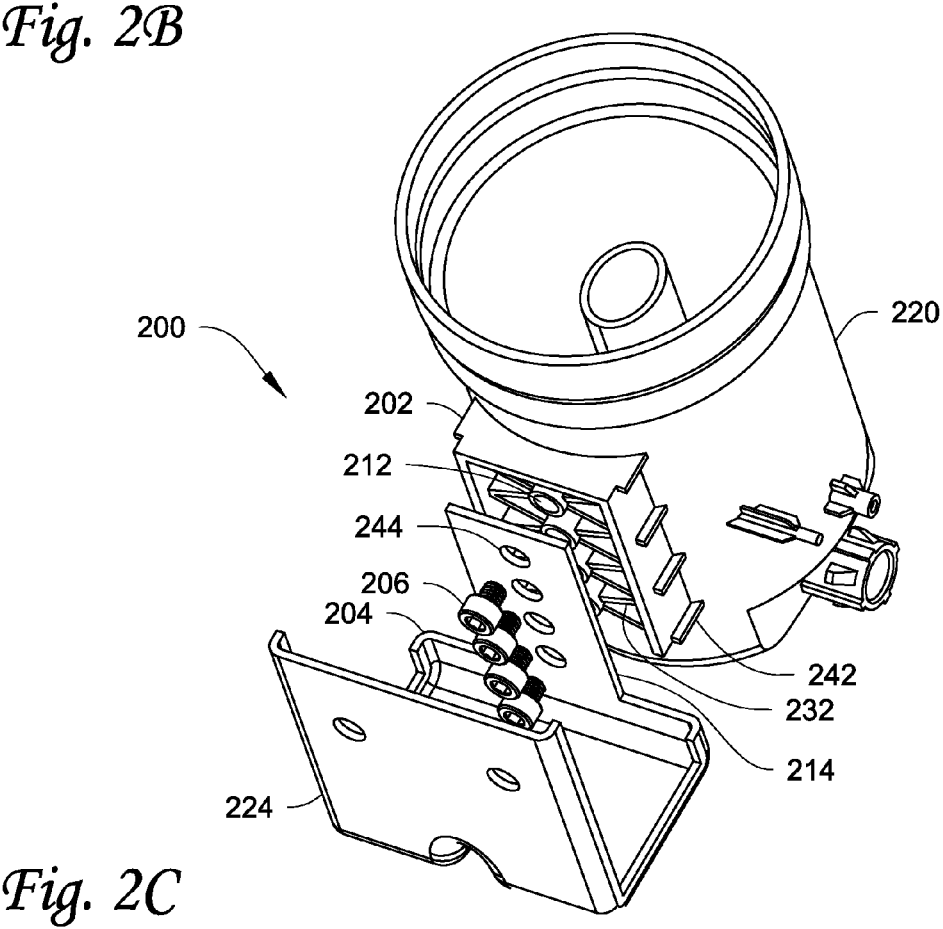
FIG. 2B is a perspective exploded view of the mounting interface of FIG. 2A, the mounting bracket, and retention component.
Figure 2C:
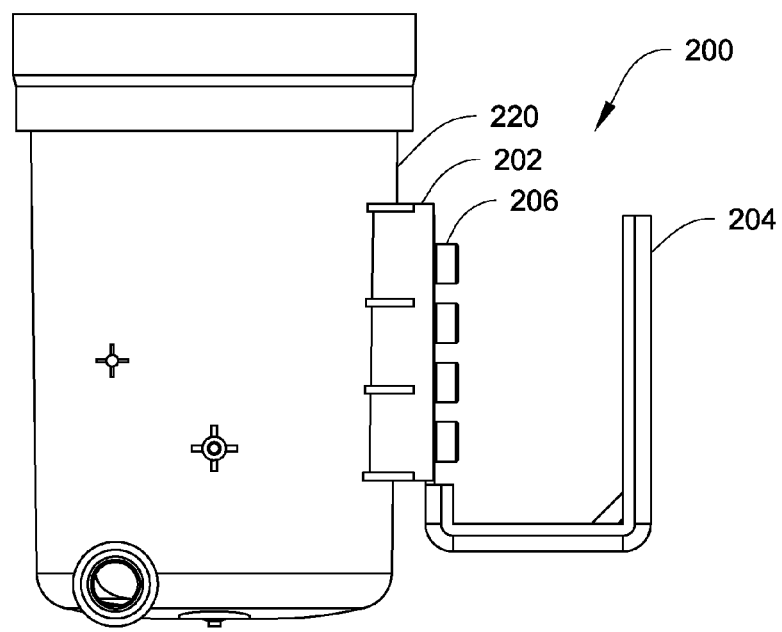
FIG. 2C is a side view of the mounting interface of FIG. 2A showing the mounting interface connected with the mounting bracket.

With reference to FIGS. 2A-2C, a mounting assembly 200 according to another embodiment is illustrated. Generally, FIGS. 2A-C illustrate that the assembly 200 is constructed where the interface 202 (and housing 220) is connected to the bracket 204 with retention components 206 that are fasteners.

In the embodiment shown, the mounting interface 202 is a protruding portion. The mounting interface 202 is disposed about an outer housing or shell 220 of a filtration module, such as a fuel filter. The mounting interface 202 can be integrally molded with the housing 220 structure, which can be a composite material. In appropriate circumstances, the mounting interface 202 is not integrally molded but separately attached to the housing 220.

The mounting bracket 204 is connectable to the mounting interface 202. The mounting bracket 204, for example, is a u-shaped bracket with one plate 214 that is connectable to the mounting interface 202. Another plate 224 is connectable to another equipment, for example, a vehicle body.

The mounting interface 202 can have a particular reinforced configuration, and may also be constructed of a material having a higher stress margin than the mounting bracket 204. For example, the mounting interface 202 in some embodiments can be a composite material structured to have a higher stress margin at certain mounting points than the mounting bracket 204 which may be metal.

In the embodiment shown, the protruding portion of the interface 202 has a generally rectangular shaped rim constructed of vertical and horizontal walls. The mounting interface 202 and the housing 220, when farmed from the same mold, can be constructed of a composite material, for example 33% GF Nylon. It will be appreciated that functionally equivalent composite materials other than 33% GF Nylon may be employed or, as appropriate, materials which may or may not be a composite material may also be employed.

With further reference to the mounting interface 202, the protruding portion generally includes a mounting feature 212 that engages a corresponding mounting feature 244 (further described below) of the mounting bracket 204. As shown, the mounting feature 212, for example, includes one or more holes extending into the protruding portion. The holes 212 can be cylindrical. As further shown, the holes 212 are respectively disposed within the area defined by the vertical and horizontal walls of the protruding portion. It will be appreciated that this specific configuration is not meant to be limiting and the holes 222 can be located in other positions on the interface 202 as appropriate.

The interface 202 also includes reinforcing members 232, 242. As shown, the reinforcing members are disposed within or on the vertical and horizontal walls of the protruding portion. As shown, reinforcing members 232 are ribs between the inner rim of the vertical and horizontal wall structure of the protruding portion. As one example only, the ribs can be angled to form truss like reinforcements. The reinforcing members 232 add stiffness to the overall structure of the interface 202. The reinforcing members 242 in some embodiments are shown as supports on the outer rim of the protruding wall structure. The reinforcing members 232, 242 can be constructed of a mold material, for example, molded along with the entire interface 202. The reinforcing members 232, 242 help to provide a stronger assembly structure with increased stress margins on the module side (e.g. stronger than a mating metal bracket).

With reference to the mounting bracket 204, the mounting bracket 204 can be constructed of a metal or composite material. In many instances, the mounting bracket 204 is metal, such as a cold rolled mild steel, and in some embodiments is constructed of material that has a lower stress margin than the interface 202.

With further reference to the plate 214, the interface 202 receives the plate 214 within a clearance area. As shown, the plate 214 can be placed within the inner rim of the vertical/horizontal wall structure of the protruding portion during operation. In some embodiments, plate 214 is dimensioned and sized so that it mates with a dimension of the protruding portion. Still in some embodiments, the space provided by the inner rim can have a slightly larger dimension than the plate 214 to give a somewhat snug fit before the retention component 206 is assembled.

As with the interface 202, the mounting bracket 204 also has a mounting feature 244 that correspond with the mounting features 212 of the interface 202. In the example shown, the mounting feature 244 is one or more through holes in the plate 214 which are designed to align with the corresponding feature 212 (holes) of the interface 202. It will be appreciated that this specific configuration is not meant to be limiting. As with holes 212, holes 244 can be located on the bracket 204 in other positions as appropriate.

With reference to the retention component 206, the retention component 206 in some embodiments includes one or more fasteners. For example, the fasteners can be screws, bolts, or the like, or any appropriate retention structure, and can be constructed of a metal or composite material. The fasteners are insertable through the holes 244 and into the holes 212 to secure the interface 202 and bracket 204 together.

FIGS. 3A-3C

Figure 3A:
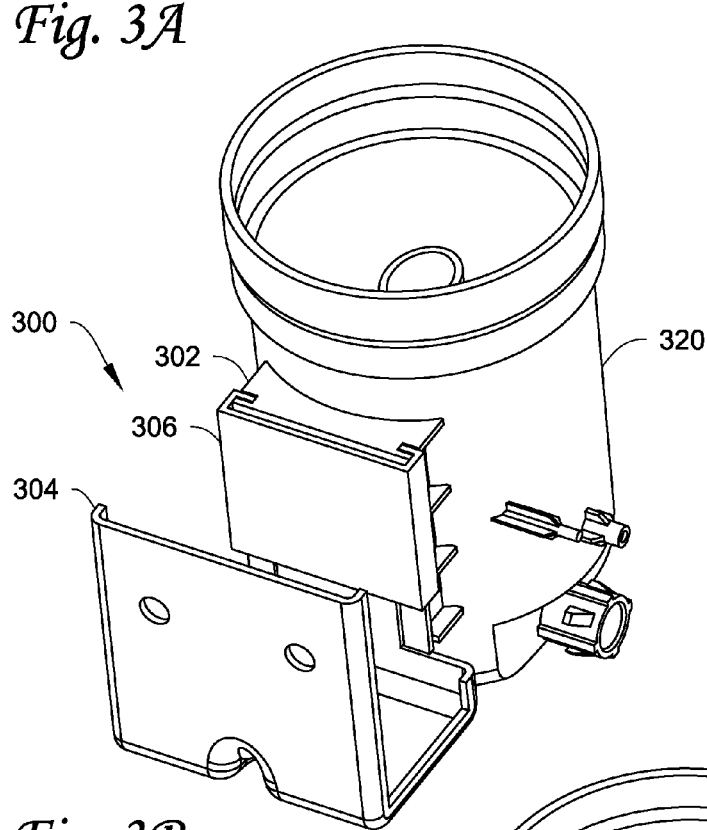
FIG. 3A is a perspective view of another embodiment for a mounting interface on a filtration housing and showing the mounting interface connected to a mounting bracket.
Figure 3B:
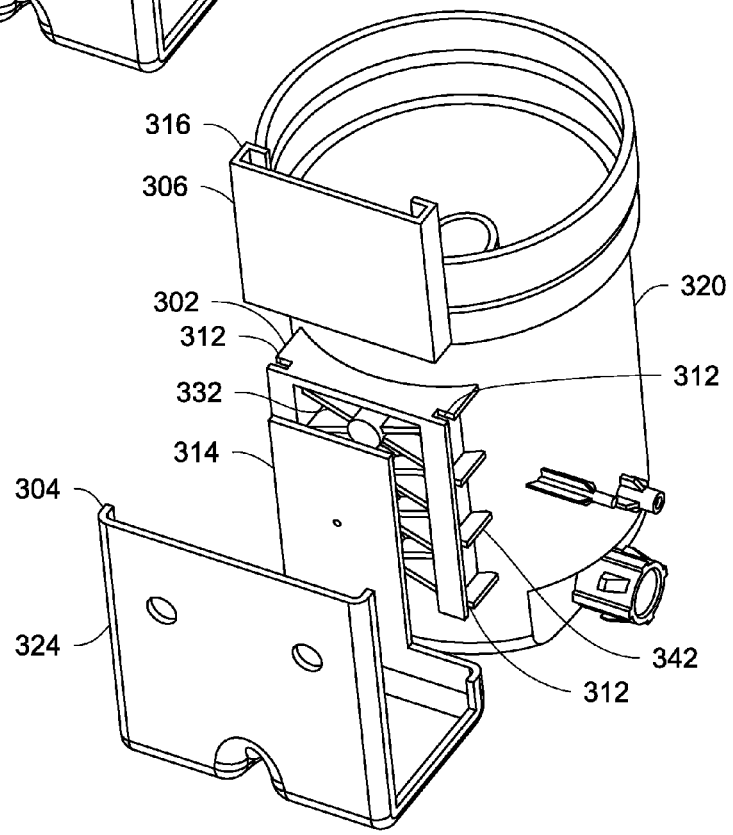
FIG. 3B is a perspective exploded view of the mounting interface of FIG. 3A, the mounting bracket, and retention component.
Figure 3C:
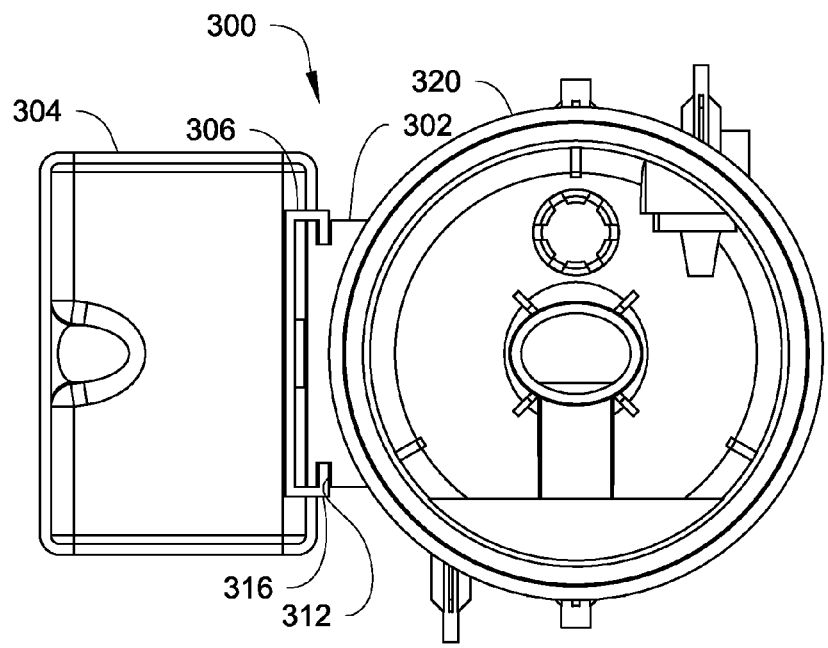
FIG. 3C is a top view of the mounting interface of FIG. 3A showing the mounting interface connected with the mounting bracket.

With reference to FIGS. 3A-3C, a mounting assembly 300 according to another embodiment is illustrated. Generally, the interface 302 and bracket 304 are connected by a retention component 306 that slides over the interface 302 and bracket 304. For example, the retention component 306 slides down from the top and is positioned over the bracket 304 and interface 302.

In the embodiment shown, the mounting interface 302 is a protruding portion. The mounting interface 302 is disposed about an outer housing or shell 320 of a filtration module, such as a fuel filter. The mounting interface 302 can be integrally molded with the housing 320 structure, which can be a composite material. In appropriate circumstances, the mounting interface 302 is not integrally molded but separately attached to the housing 320.

The mounting bracket 304 is connectable to the mounting interface 302. The mounting bracket 304, for example, is a u-shaped bracket with one plate 314 that is connectable with the mounting interface 302. Another plate 324 is connectable to another equipment, for example a vehicle body.

The mounting interface 302 can have a particular reinforced configuration, and may also be constructed of a material having a higher stress margin than the mounting bracket 304. For example, the mounting interface 302 in some embodiments can be a composite material structured to have a higher stress margin at certain mounting points than the mounting bracket 304 which may be metal.

In the embodiment shown, the protruding portion of the interface 302 has a generally rectangular shaped rim constructed of vertical and horizontal walls. The mounting interface 302 and the housing 320, when formed from the same mold, can be constructed of a composite material, for example 33% GF Nylon. It will be appreciated that functionally equivalent composite materials other than 33% GF Nylon may be employed or, as appropriate, materials which may or may not be a composite material may also be employed.

With further reference to mounting interface 302, the protruding portion generally includes a mounting feature 312. As shown, the mounting feature 312, for example, are slots made in the outer walls of the interface 302. The slots 312 receive the retention component 306 to secure the bracket 304 to the interface 302 (further described below).

The interface 302 also includes reinforcing members 332, 342. As shown, the reinforcing members are disposed within or on the vertical and horizontal walls of the protruding portion. In one example only, the reinforcing members 332 are ribs between the inner rim of the vertical and horizontal wall structure of the protruding portion. In one embodiment, the ribs can be angled to form truss like reinforcements. The reinforcing members 332 add stiffness to the overall structure of the interface 302. The reinforcing members 342 in some embodiments are shown as supports on the outer rim of the protruding wall structure. The reinforcing members 332, 342 can be constructed of a mold material, for example molded along with the entire interface 302. The reinforcing members 332, 342, help to provide a stronger assembly structure with increased stress margins on the module side (e.g. stronger than a mating metal bracket).

With reference to the mounting bracket 304, the mounting bracket 304 can be constructed of a metal or composite material and is similarly constructed as mounting bracket 204 but without through holes. In many instances, the mounting bracket 304 is metal, such as a cold rolled mild steel, and in some embodiments is constructed of material that has a lower stress margin than the interface 302. With further reference to the plate 314, the interface 302 receives the plate 314 within a clearance area. As shown, the plate 314 can be placed within the inner rim of the vertical/horizontal wall structure of the protruding portion during operation. In some embodiments, plate 314 is dimensioned and sized so that it mates with a dimension of the protruding portion. Still in some embodiments, the space provided by the inner rim can have a slightly larger dimension than the plate 314 to give a somewhat snug fit before the retention component 306 is assembled.

With further reference to the retention component 306, the retention component 306 in some embodiments is a fastener designed as a clip. For example, the clip 306 can be constructed of a metal or composite material such as plastic. As shown, the clip 306 includes bracket arms 316 that are configured to slide into the slots 312. The clip 306 is configured to slide down from the top to lock both bracket and module in position, and secure them together. As shown, the clearance area of the interface 302 receives the plate 314. The bracket arms 316 are slidable into the slots 312, so that the retention component 306 is positionable over a portion of the mounting bracket (e.g. plate 314) and over a portion of the mounting interface to lock the mounting interface 302 to the bracket 304.

FIGS. 4A-4C

Figure 4A:
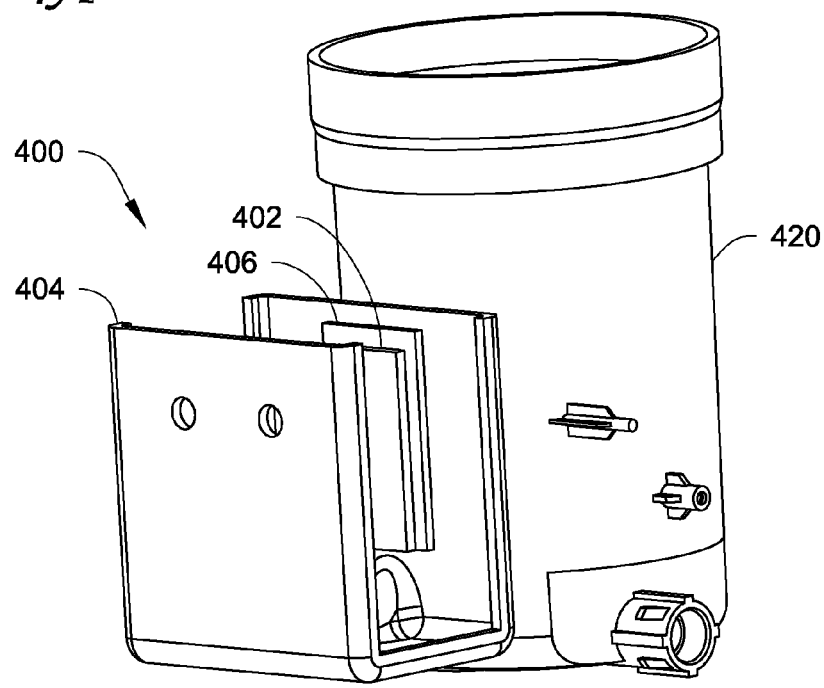
FIG. 4A is a perspective view of one embodiment for a mounting interface on a filtration housing and showing the mounting interface connected to a mounting bracket.
Figure 4B:
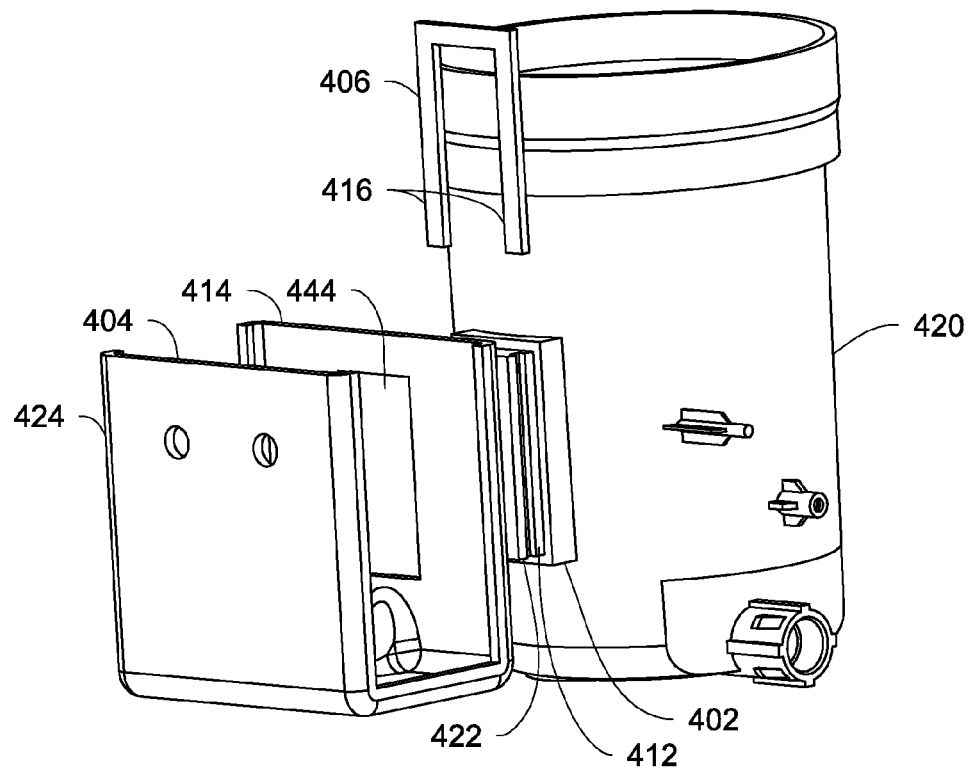
FIG. 4B is a perspective exploded view of the mounting interface of FIG. 4A, the mounting bracket, and retention component.
Figure 4C:
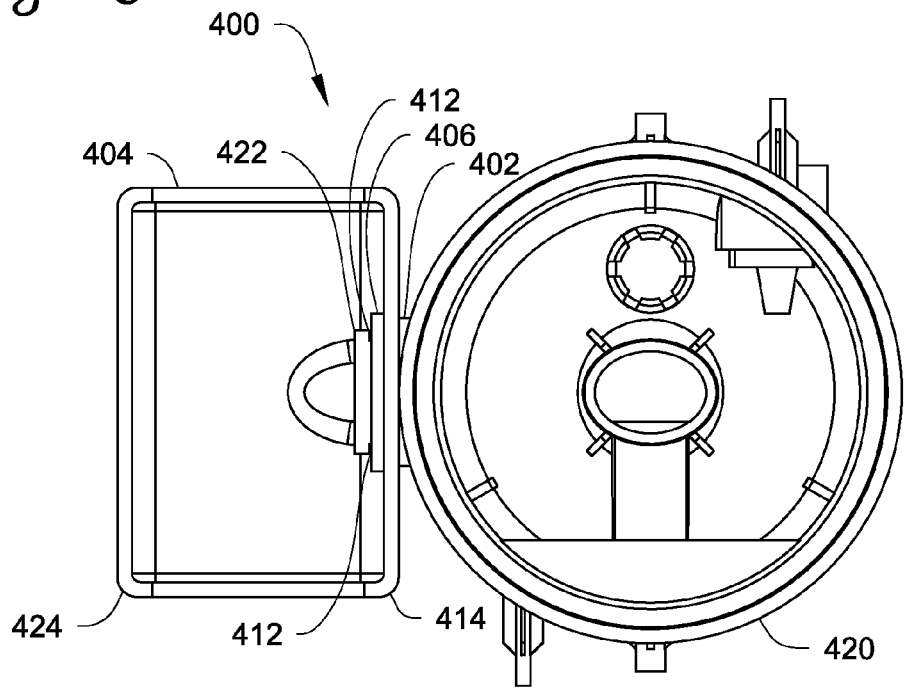
FIG. 4C is a top view of the mounting interface of FIG. 4A showing the mounting interface connected with the mounting bracket.

With reference to FIGS. 4A-4C, a mounting assembly 400 according to yet another embodiment is illustrated. Generally, the interface 402 and bracket 404 are connected by sliding a retention component 406 to secure the interface 402 and bracket 404.

In the embodiment shown, the mounting interface 402 is a protruding portion. The mounting interface 402 is disposed about an outer housing or shell 420 of a filtration module, such as a fuel filter. The mounting interface 402 can be integrally molded with the housing 420 structure, which can be a composite material. In appropriate circumstances, the mounting interface 402 is not integrally molded but separately attached to the housing 420.

The mounting bracket 404 is connectable to the mounting interface 402. The mounting bracket 404, for example, is a u-shaped bracket with one plate 414 that is connectable with the mounting interface 402. Another plate 424 is connectable to another equipment, for example a vehicle body.

The plate structure 414 on the side that connects with the mounting interface 402 is constructed and arranged to have an open area 444 (further described below). Generally, the open area 444 is receivable of the protruding portion of the mounting interface 402. The open area 444 is dimensioned and sized so as to mate with a dimension of the protruding portion.

Generally, the retention component 406 retains the protruding portion of the mounting interface 402 within the open area 444 of the mounting bracket 404 in a mating engagement.

The mounting interface 402 can have a particular reinforced configuration, and may also be constructed of a material having a higher stress margin than the mounting bracket 404. For example, the mounting interface 402 in some embodiments can be a composite material structured to have a higher stress margin at certain mounting points than the mounting bracket 404 which may be metal. The interface 402 also includes an overall thickness in its profile which gives the interface suitable stiffness and strength.

In the embodiment shown, the protruding portion of the interface 402 has a generally rectangular shaped rim constructed of vertical and horizontal walls. The mounting interface 402 and the housing 420, when formed from the same mold, can be constructed of a composite material, for example 33% GF Nylon. It will be appreciated that functionally equivalent composite materials other than 33% GF Nylon may be employed or, as appropriate, materials which may or may not be a composite material may also be employed.

With further reference to the mounting interface 402, the protruding portion generally includes a mounting feature 412. As shown, the mounting feature 412, for example, are slots or grooves made in the outer walls of the interface 402. As shown, the slots 412 extend along the sides of the protruding portion and are formed at an intermediate position of the protruding portion before a lead portion 422. The slots 412 are configured to receive the retention component 406 and secure the bracket 404 to the interface 402 (further described below).

With further reference to the mounting bracket 404, the mounting bracket 404 can be constructed of a metal or composite material. In many instances, the mounting bracket 404 is metal, such as a cold rolled mild steel, and in some embodiments is constructed of material that has a lower stress margin than the interface 402. With further reference to the plate 414, the plate 414 receives the protruding portion of the interface 402 within the open area 444, which acts as a mounting feature. The lead protruding portion 422 is the portion of the interface 402 that extends through the open area 444 of the bracket 404. As shown, the lead protruding portion 422 is insertable into the open area 444 during operation and secured on the side of the plate 414 opposite the housing 420 (and filtration module side). In some embodiments, the open area 444 is dimensioned and sized so that it mates with a dimension of the protruding portion. Still in some embodiments, the open area 444 can have a slightly larger dimension than the protruding portion so as to give a somewhat snug fit before the retention component 406 is assembled.

With further reference to the retention component 406, the retention component 406 in some embodiments is a fastener designed with retaining arms. For example, the retention component 406 is a u-plate including arms 416 that can be constructed of a metal or composite material such as plastic. The arms 416 are configured to slide down, for example from the top, and into the slots 412 so as to lock both bracket 404 and interface 402 in position, and secure them together. As shown, the open area 444 is receivable of the lead portion 422, and the arms 416 of the retention component 406 are slidable into the slots 412, so that the retention component 406 is positionable over a portion of the mounting bracket and over a portion of the mounting interface to lock the mounting interface 402 to the mounting bracket 404.

FIGS. 5A-5D

With reference to FIGS. 5A-5D, a mounting assembly 500 according to yet another embodiment is illustrated. Generally, the mounting interface 502 in this embodiment is a protruding portion with multiple lead portions, which can be inserted through the bracket 504. The interface 502 and bracket 504 are connected by sliding a retention component 506 to secure the interface 502 and bracket 504. Each lead portion has a groove which can be engaged by the retention component 506. In one embodiment, the retention component 506 can slide down from the top to securely lock the assembly in place.

As shown, the mounting interface 502 is a protruding portion, and is disposed about an outer housing or shell 520 of a filtration module, such as a fuel filter. The mounting interface 502 can be integrally molded with the housing 520 structure, which can be a composite material. In appropriate circumstances, the mounting interface 502 is not integrally molded but separately attached to the housing 520.

The mounting bracket 504 is connectable to the mounting interface 502. The mounting bracket 504, for example, is a u-shaped bracket with one plate 514 that is connectable with the mounting interface 502. Another plate 524 is connectable to another equipment, for example a vehicle body. The plate structure 514 is on the side that connects with the mounting interface 502 and is constructed and arranged to have at least one open area 544 (further described below). Generally, the open areas 544 are receivable of part of the protruding portion (lead portions 522) of the mounting interface 502. In some embodiments, the open areas 544 are dimensioned and sized so as to mate with a dimension of the protruding portion.

The mounting interface 502 can have a particular reinforced configuration, and may also be constructed of a material having a higher stress margin than the mounting bracket 504. For example, the mounting interface 502 in some embodiments can be a composite material structured to have a higher stress margin at certain mounting points than the mounting bracket 504 which may be metal. The interface 502 also includes an overall thickness in its profile which gives the interface suitable stiffness and strength.

In some examples, the protruding portion of the interface 502 is generally rectangular shaped. The mounting interface 502 and the housing 520, when formed from the same mold, can be constructed of a composite material, for example 33% GF Nylon. It will be appreciated that functionally equivalent composite materials other than 33% GF Nylon may be employed or, as appropriate, materials which may or may not be a composite material may also be employed.

With further reference to the mounting interface 502, the protruding portion generally includes a mounting feature 512. As shown, the mounting feature 512, for example, are slots or grooves made in the outer walls of the interface 502. As shown, the slots 512 extend along the sides of the protruding portion and are formed at an intermediate position of the protruding portion before a lead portion 522. The slots 512 are configured to receive the retention component 506 to secure the bracket 504 to the interface 502 (further described below). In the embodiment shown, slots 512 are vertically arranged for the retention component 506 to slide along.

With further reference to the mounting bracket 504, the mounting bracket 504 can be constructed of a metal or composite material. In many instances, the mounting bracket 504 is metal, such as a cold rolled mild steel, and in some embodiments is constructed of material that has a lower stress margin than the interface 502.

With further reference to the plate 514, the plate 514 receives the protruding portion of the interface 502 within at least one open area 544, which acts as a mounting feature. As shown, the open areas 544 are configured as multiple openings that allow the lead protruding portions 522 to be inserted. The lead protruding portion 522 is the portion of the interface 502 that extends through the open areas 544 of the bracket 504. As shown, the lead protruding portions 522 are insertable into the open areas 544 during operation and secured on the side of the plate 514 opposite the housing 520 (and filtration module side). In some embodiments, open areas 544 are dimensioned and sized so that it mates with a dimension of the protruding portion. Still in some embodiments, the open areas 544 can have a slightly larger dimension than the protruding portion so as to give a somewhat snug fit before the retention component 506 is assembled.

With further reference to the retention component 506, the retention component 506 in some embodiments is a fastener designed as a locking plate with arms 516 and retaining slots 526 therebetween. The retention component 506 can be constructed of a metal or composite material such as plastic. The arms 516 are configured to slide down, for example from the top, and through the grooves 512, and the lead portions 522 are received in the slots 526, so as to lock both bracket 504 and interface 502 in position, and secure them together. As shown, each lead portion 522 has a groove which can be engaged by an arm 516 of the retention component 506.

As shown, the open areas 544 are receivable of the lead portions 522, and the retaining arms 516 of the retention component 506 are slidable into the grooves 526, so that the retention component 506 is positionable over a portion of the mounting bracket and over a portion of the mounting interface to lock the mounting interface 502 to the mounting bracket 504.

Figure 5A:
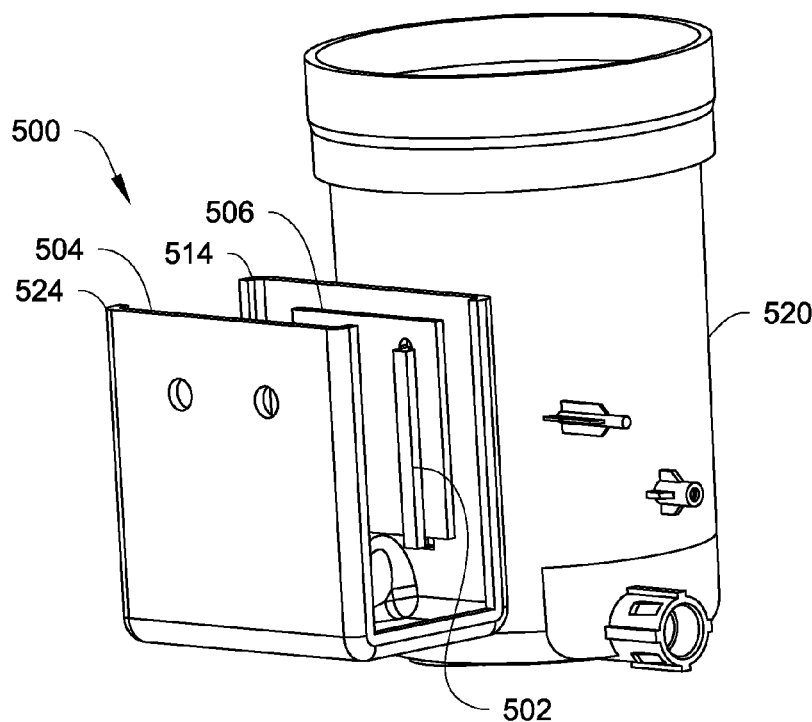
FIG. 5A is a perspective view of one embodiment for a mounting interface on a filtration housing and showing the mounting interface connected to a mounting bracket.
Figure 5B:
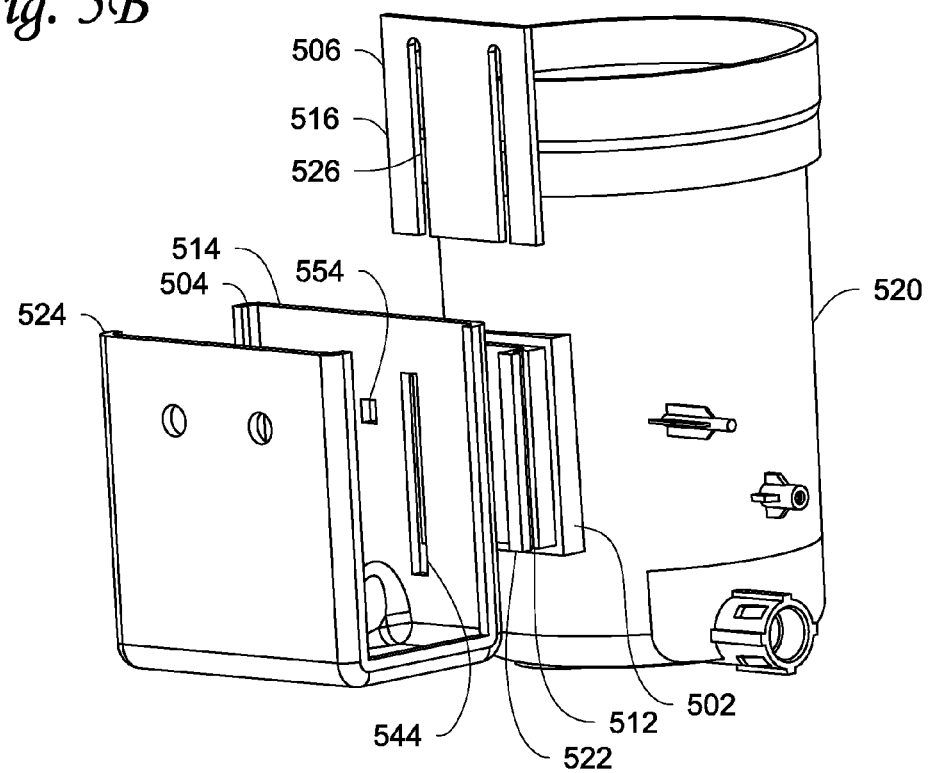
FIG. 5B is a perspective exploded view of the mounting interface of FIG. 5A, the mounting bracket, and retention component.
Figure 5C:
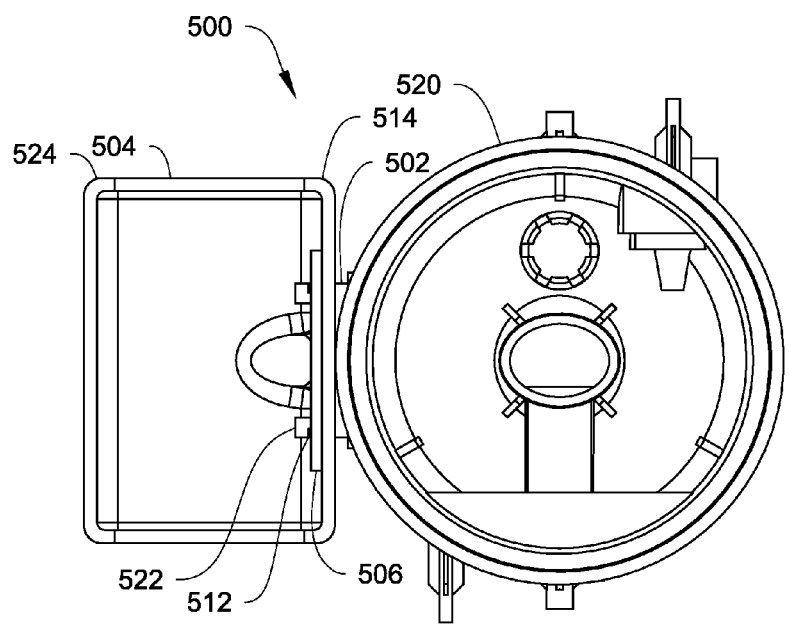
FIG. 5C is a top view of the mounting interface of FIG. 5A showing the mounting interface connected with the mounting bracket.
Figure 5D:
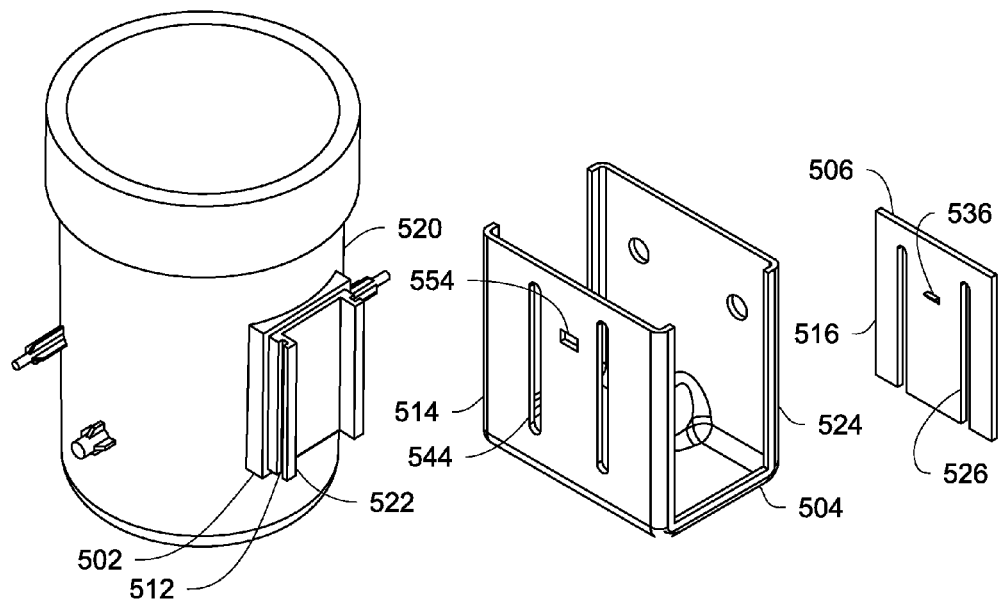
FIG. 5D is another exploded view of the mounting interface of FIG. 5A.
Figure 6A:
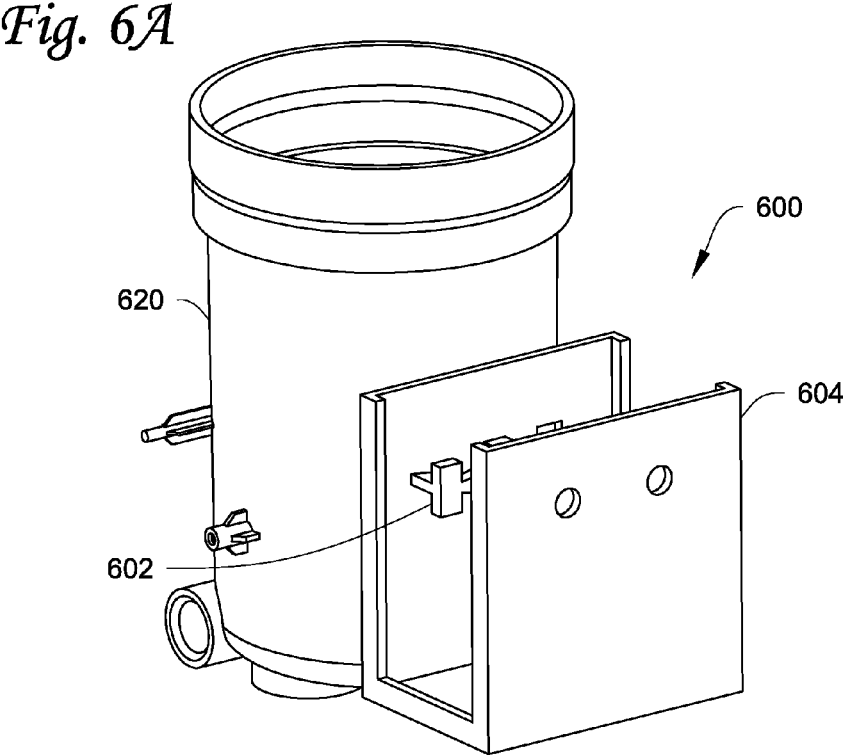
FIG. 6A is a perspective view of one embodiment for a mounting interface on a filtration housing and showing the mounting interface connected to a mounting bracket.
Figure 6B:
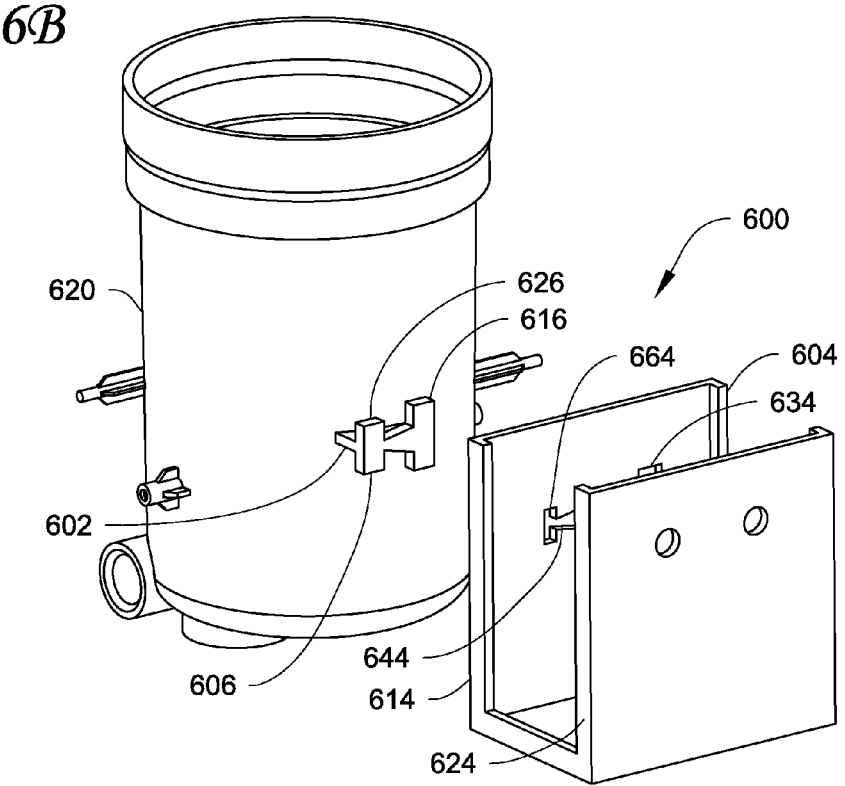
FIG. 6B is a perspective exploded view of the mounting interface of FIG. 6A, the mounting bracket, and retention component.
Figure 6C:
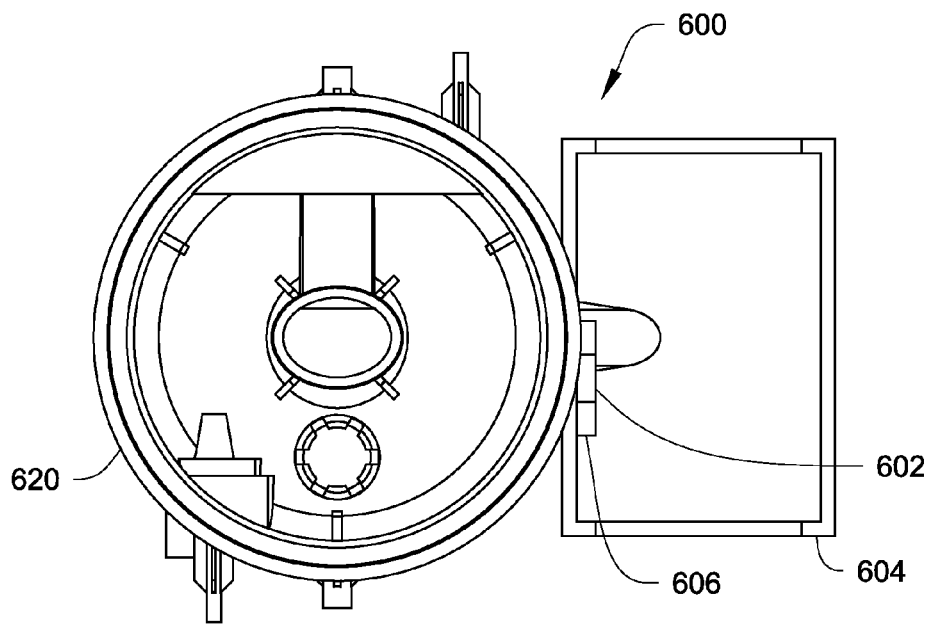
FIG. 6C is a top view of the mounting interface of FIG. 6A showing the mounting interface connected with the mounting bracket.
Figure 6D:
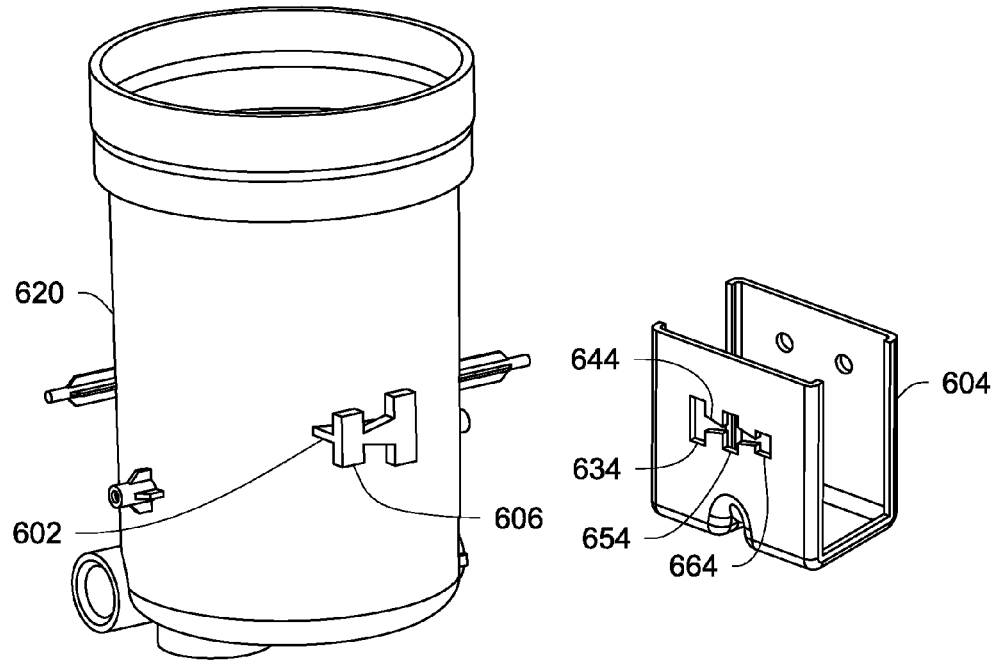
FIG. 6D is another exploded view of the mounting interface of FIG. 6A.

The retention component 506 and bracket 504 in some instances may include another mounting feature. As best shown in FIG. 5D for example, the retention component 506 can have a catch member 536 that is receivable by an opening 554 to further lock and engage the interface 502 with the bracket. For example, the catch member 536 is configured as a ramp and stop structure, where the ramp allows the retention member slide down from the top. Once the catch member 536 passes a threshold position, it enters the opening 554 and the stop prevents upward movement of the catch member 536.

FIGS. 6A-6D

With reference to FIGS. 6A-6D, a mounting assembly 600 according to yet another embodiment is illustrated. Generally, the mounting interface 602 in this embodiment is a protruding portion with multiple lead portions that can be positioned through the bracket 604 and be secured by shifting the interface 602 (and filtration module) to a lock position. For example, the interface 602 can be shifted horizontally to a locked position which secures the interface 602 (and filtration module, housing 620) to the bracket 604. In this embodiment, the configuration of the lead portions of the interface 602 and the open area of the bracket 604 act as the retention component 606.

In the embodiment shown, the mounting interface 602 is a protruding, portion, and is disposed about an outer housing or shell 620 of a filtration module, such as a fuel filter. The mounting interface 602 can be integrally molded with the housing 620 structure, which can be a composite material. In appropriate circumstances, the mounting interface 602 is not integrally molded but separately attached to the housing 620.

The mounting bracket 604 is connectable to the mounting interface 602. The mounting bracket 604, for example, is a u-shaped bracket with one plate 614 that is connectable with the mounting interface 602. Another plate 624 is connectable to another equipment, for example a vehicle body. The plate structure 614 on the side that connects with the mounting interface 602 is constructed and arranged to have an open area 644 (further described below). Generally, the open area 644 is receivable of the protruding portion of the mounting interface 602. The open area 644 is dimensioned and sized so as to mate with a dimension of the protruding portion.

The mounting interface 602 can have a particular reinforced configuration, and may also be constructed of a material having a higher stress margin than the mounting bracket 604. For example, the mounting interface 602 in some embodiments can be a composite material structured to have a higher stress margin at certain mounting points than the mounting bracket 604 which may be metal. The interface 602 can also includes an overall thickness in its profile which gives the interface suitable stiffness and strength.

With further reference to the mounting interface 602, the protruding portion includes the retention component 606. The retention component 606 generally includes mounting features 616 and 626 that are integral with the interface 602. In the embodiment shown, the mounting features 616, 626, for example, are stepped lead protrusions. The lead protrusions can have a T shape (when viewed from the side) where lead protrusion 626 is smaller than lead protrusion 616. The lead protrusions are insertable in the open area 644 of the bracket and can be positioned to secure the interface 602 with the bracket 604 (further described below).

With further reference to the mounting bracket 604, the mounting bracket 604 can be constructed of a metal or composite material. In many instances, the mounting bracket 604 is metal, such as a cold rolled mild steel, and in some embodiments is constructed of material that has a lower stress margin than the interface 602.

With further reference to the plate 614, the plate 614 receives the protruding portion of the interface 602 within an open area 644, which acts as a mounting feature. The lead protrusions 616, 626 can extend through certain sized openings of the open area 644. As shown, the lead protrusion 616 is insertable into the opening 634, and the lead protrusion 626 is insertable into opening 654. The lead protrusions 616, 626 generally match the dimension and size of openings 634, 654, respectively but are small enough to be inserted into the openings. That is, the openings 634, 654 are slightly larger than the lead protrusions 616, 626 to allow enough clearance. During operation, the lead portions 616, 626 are secured on the side of the plate 614 opposite the housing 620 (and filtration module side). The protrusions 616, 626 are secured to the bracket 604 by shilling the interface 602 (and housing 620 of the filtration module). The protrusions 616, 626 are moved so that protrusion 626 is moved to a smaller opening 664 of the open area 644, and the protrusion 616 is moved to the opening 654, which is smaller than opening 634. Such a configuration provides the locking position of the interface 602 relative to the bracket 604. In the embodiment shown, the interface 602 is moved, for example, horizontally to a locked position which secures the interface 602 to the bracket 604.

FIGS. 7A-7P

With reference to FIGS. 7A-7L, a mounting assembly 700 according to yet another embodiment is illustrated. The mounting assembly 700 provides a tilt and snap locking interface, with a modified locking retainer structure. The modified locking retainer structure is a slidable retention component connected to the mounting interface.

In the embodiment shown, the mounting assembly 700 includes a mounting interface 702 constructed and arranged as a protruding portion. As shown, the mounting interface 702 is disposed about an outer housing or shell 720 of a filtration module, such as a fuel filter. As one preferred example, the mounting interface 702 is integrally molded with the housing 720 structure, which can be a composite material. If appropriate, it will be appreciated that the mounting interface 702 may not be integrally molded but separately attached to the housing 720.

A mounting bracket 704 is connectable to the mounting interface 702. In the embodiment shown, the mounting bracket 704 has one plate 714 that faces the mounting interface 702 and another plate 724 connectable to another equipment, for example a vehicle body. It will be appreciated that the mounting bracket 704, where appropriate, can be other shapes and configurations than the bracket specifically shown and, where appropriate, the equipment to which the plate 724 can be connected may be a body other than a vehicle body.

With further reference to the mounting bracket 704, a plate 714 faces the mounting interface 702 and a plate 724 can connect to another equipment, such an engine component. As in previous embodiments, the plate 714 has mount members 734 constructed and arranged to have an open area 744 between the mount members 734 (further described below). Generally, the open area is receivable of the protruding portion of the mounting interface 702. As in earlier embodiments, the open area is dimensioned and sized so as to mate with a dimension of the protruding portion.

With reference to the modified locking retainer, the assembly 700 includes a retention component 706 configured to maintain connection of the mounting interface 702 to the mounting bracket 704. The retention component 706 retains the protruding portion of the mounting interface 702 within the open area of the mounting bracket 704 in a mating engagement.

As in the previous embodiments, the mounting interface 702 can have a particular reinforced configuration, and may also be constructed of a material having a higher stress margin than the mounting bracket 704. For example, the mounting interface 702 in some embodiments can be a composite material structured to have a higher stress margin than the mounting bracket 704 which may be metal.

As with the previous embodiments, the protruding portion of the mounting interface 702 can have a generally rectangular shaped rim constructed of vertical and horizontal walls. See e.g. FIGS. 7C and 7E. The mounting interface 702 can be an integral part of a housing for a liquid filtration module (e.g. 702 and 720 formed from one mold), and can be designed for quick installation and release. The mounting interface 702 and the housing 720 when formed from the same mold, can be constructed of a composite material, for example 33% GF Nylon. It will be appreciated that functionally equivalent composite materials other than 33% GF Nylon may be employed or, as appropriate, materials which may or may not be a composite material may also be employed. As shown, the mounting interface 702 provides a robust structure (e.g. outer housing of the filter) that can be connected and secured with the mounting bracket 704 in a desired application.

The vertical walls of the rim include mounting features 712, 722 that engage with the mounting bracket 704. In the embodiment shown, mounting feature 712 are flexible snaps, for example a barb on an arm 716 that extends outward from the vertical wall structure of the mounting interface 702. As shown for example in FIG. 7C, two barbed arms 712, 716 extend from the vertical wall structure of the mounting interface 702, one from each side. The barbed arms 712, 716 are received by the open area between the mount members 734 of the mounting bracket 704, and the barbed portions 712 engage the mount members 734. Rather than using through holes, the mounting interface 702 uses the barbed arms 712, 716 as the primary locking structure in the snap fit connection of the mounting interface 702 (and housing 720) and the mounting bracket 704. In one embodiment, each barbed arm 712, 716 is a somewhat rigid structure that, when engaged with the respective mount member 734, pushes against the inner side of the mount member 734. The barbed arms can be deflected slightly inward (i.e. away from the mount member 734 of the mounting bracket), by using the retention component 706 to move the assembly from a locked to unlocked position, or from an unlocked position to a locked position (described further below).

That is, the mounting feature of the mounting interface 702 is a deflectable snap 712, 716 that is pushable against a mount member 734 on the mounting bracket 704 in a locked position, and that is movable away from the mount member in an unlocked position (see FIGS. 7M-7O further described below), where the retention component 706 is a slidable locking retainer that pushes and moves the deflectable snap to and from the locked and unlocked positions under a snap fit connection. In this embodiment, the slidable locking retainer is connected to the mounting interface 702 (see FIGS. 7J-7L further described below).

The other mounting feature 722 is one or more rests that extend outward from the vertical walls of the protruding portion of interface 702. The rests 722 can be constructed as posts configured to allow resting on a corresponding mounting feature 754 of the mounting bracket 704. In some embodiments, the rests 722 can be an extruded member, and molded along with the mounting interface 702, and of similar material. As shown, the rests 722 in some instances is a semicircular shaped extrusion with a generally flat upper and curved under, which can allow pivot and tilting action to maneuver and align connection of the interface 702 with the mounting bracket 704.

With further reference to the mounting feature 722, the rests can also restrict or at least reduce movement of the composite liquid module during operation, when engaged with the mounting bracket 704.

As further shown, the mounting features 712, 722 are respectively disposed towards the top and bottom of the interface 702. It will be appreciated that this specific configuration is not meant to be limiting and the mounting features 712, 722 can be switched if desired, or otherwise be located on the interface 702 as appropriate.

As with the previous embodiments, the interface 702 can include reinforcing members disposed within the vertical and horizontal walls of the protruding portion (not shown). For example, reinforcing members (e.g. 132 of FIGS. 1A-B) in some instances are vertical and horizontal ribs between the inner rim of the outer vertical and horizontal wall structure of the protruding portion. The reinforcing members add stiffness to the overall structure of the interface 702. The reinforcing members can also be constructed of a mold material, for example molded along with the entire interface 702, and also helps to provide a stronger assembly structure with increased stress margins on the module side (e.g. stronger than a mating metal bracket).

With reference to the equipment side of the mounting assembly 700, the mounting bracket 704 can be constructed of a metal or composite material. In many instances, the mounting bracket 704 is metal, such as cold rolled mild steel, and in some embodiments is constructed of material that has a lower stress margin than the interface 702.

As shown, the plate 714 faces the interface 702 at the module side and with the plate 724 configured to connect to a body of another equipment (e.g. vehicle body). With further reference to the open area that receives the protruding portion of the mounting interface 702, the open area 744 in this embodiment is designed by two mount members 734 spaced apart to receive the mounting interface 702, so as to mount the housing 720 of the filtration module to the bracket 704.

As shown, the mounting interface 702 is placed between the mount members 734 during operation. In some embodiments, the mount members 734 are vertically configured so that the open area 744 is dimensioned and sized to mate with a dimension of the protruding portion. Still in some embodiments, the open area between the mount members 734 can have a slightly larger dimension than the interface 702 to give a somewhat snug fit before the retention component 706 is assembled.

The mounting feature 754 engages the mounting feature 722 of the interface 702, and which helps to secure the interface 702 (and housing 720) in position. The mounting feature 754, in the embodiment shown, are catch members such as, but not limited to, angular hook shaped features, which support the mounting feature 722 (e.g. rests) of the interface 702. In some embodiments, the catch members can also be designed with an inner angle based on requirement and space available on the application. For example, the outer portion of the hook that is distal from the plate 714 can angle towards the bracket 704, rather than generally upright (as shown). The catch members also restrict or at least limit movement of the interface 702 (and housing 720) during operation. As with mounting features 712, 722, mounting feature 154 can be repositioned as appropriate for engaging with interface 702.

Figure 7A:
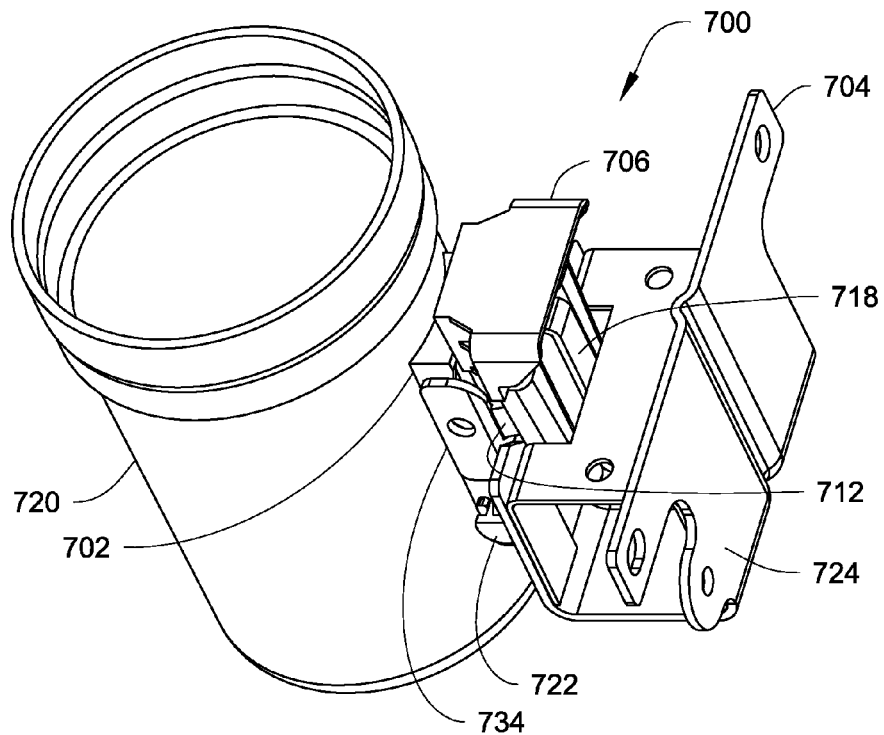
FIG. 7A is a perspective view of another embodiment for a mounting interface on a filtration housing and showing the mounting interface connected to a mounting bracket with a retention component.
Figure 7B:
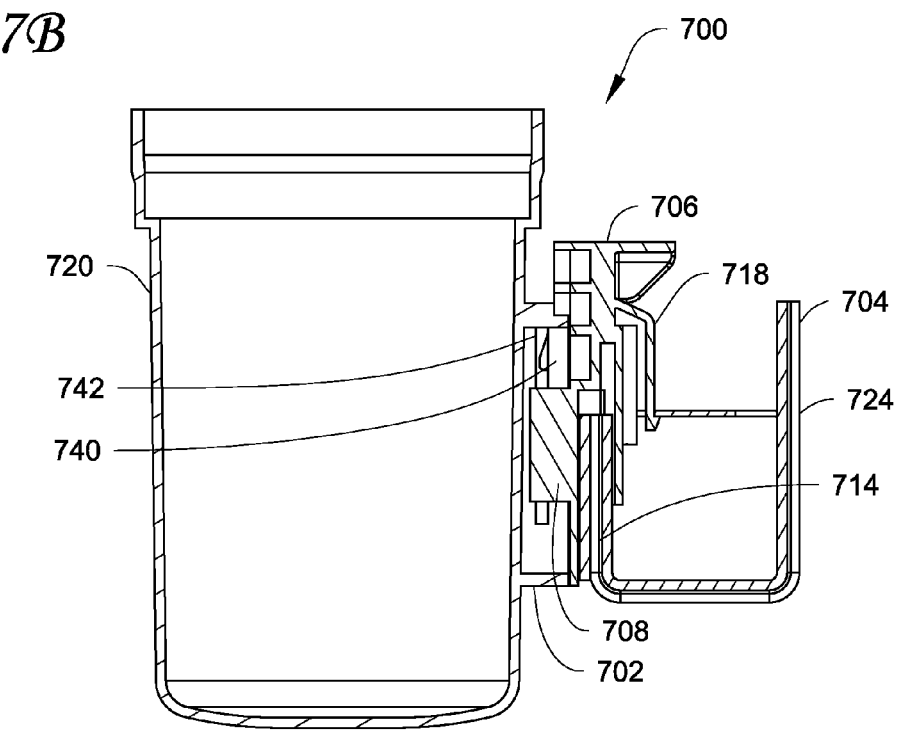
FIG. 7B is a side sectional view of the mounting interface, mounting bracket, and retention component of FIG. 7A.
Figure 7C:
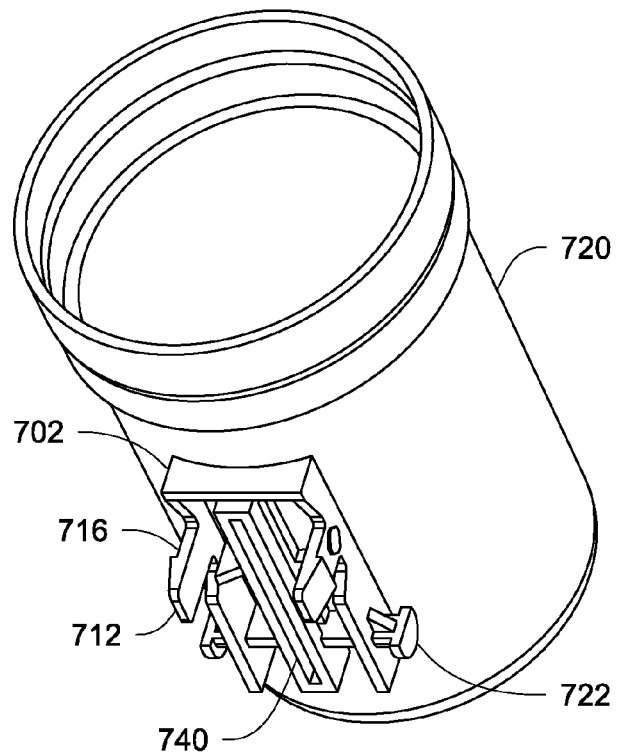
FIG. 7C is a perspective view of the mounting interface of FIG. 7A.
Figure 7D:
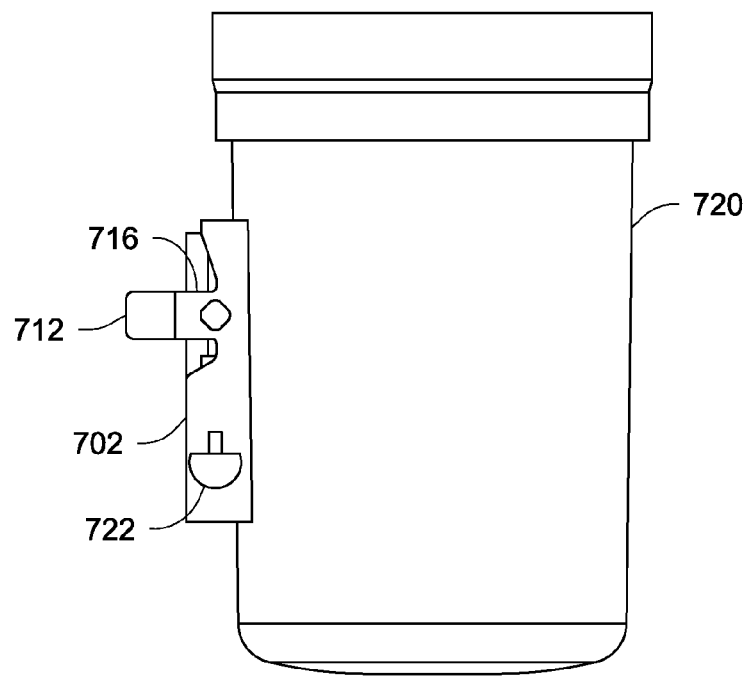
FIG. 7D is a side view of the mounting interface.
Figure 7E:
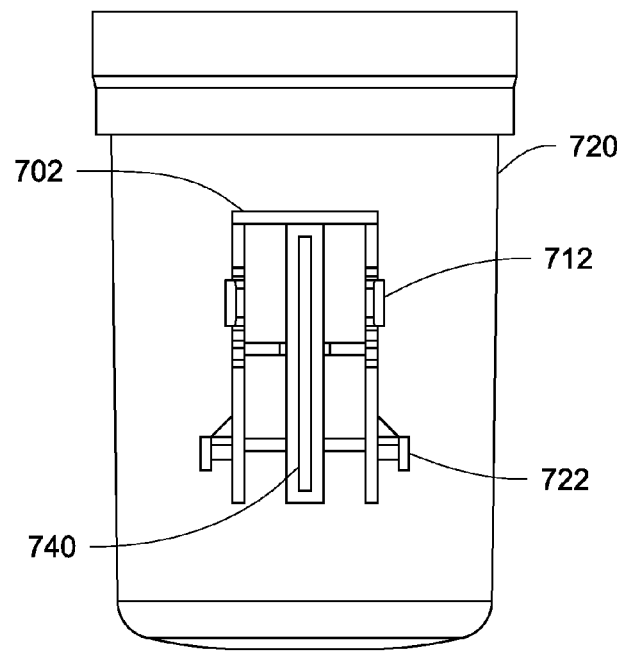
FIG. 7E is a front view of the mounting interface.
Figure 7F:
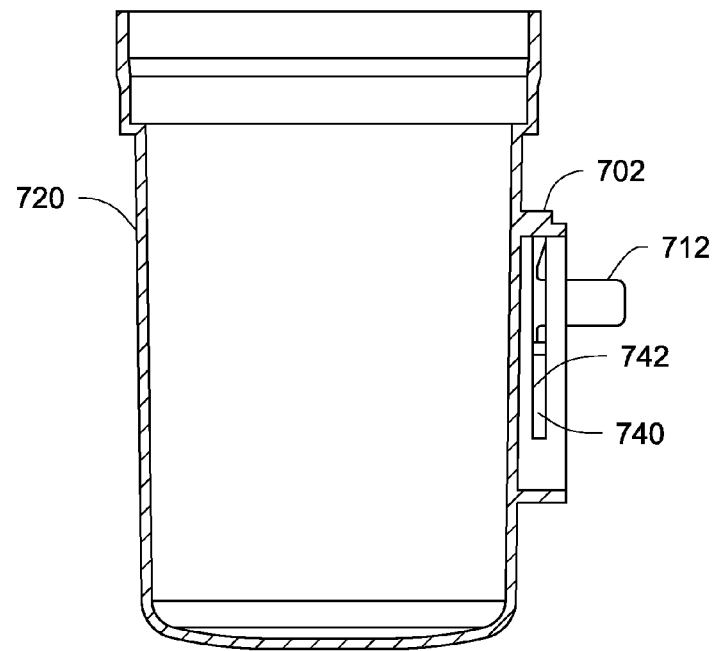
FIG. 7F is a side sectional view of the mounting interface.
Figure 7G:
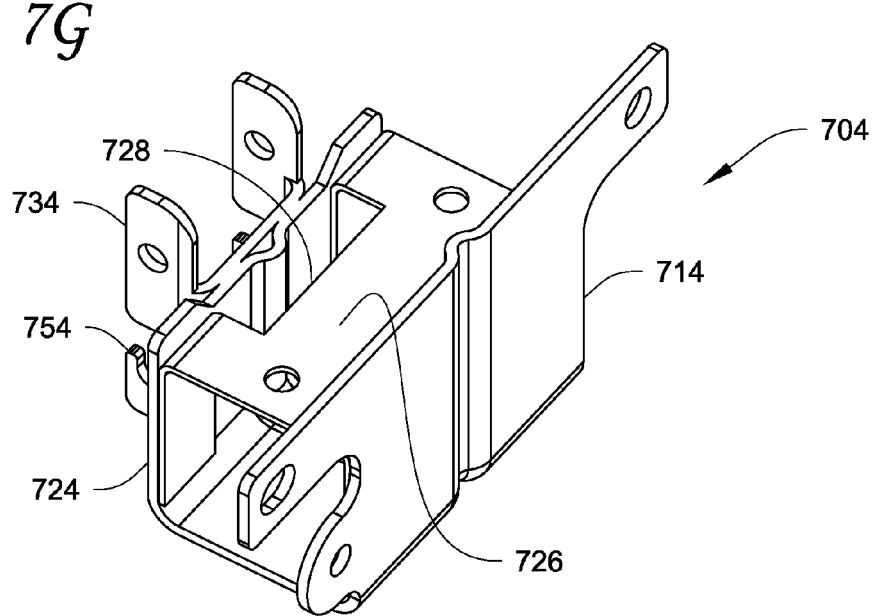
FIG. 7G is a perspective view of the mounting bracket alone.
Figure 7H:
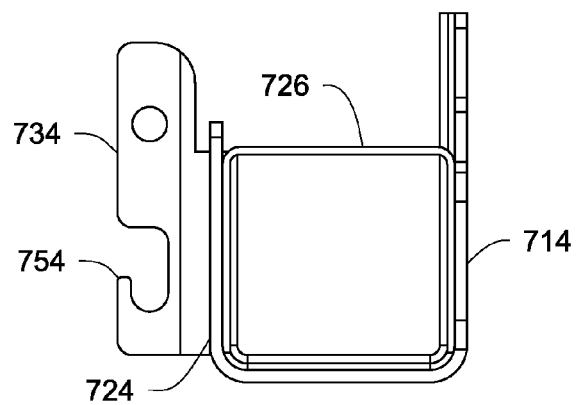
FIG. 7H is a side view of the mounting bracket alone.
Figure 7I:
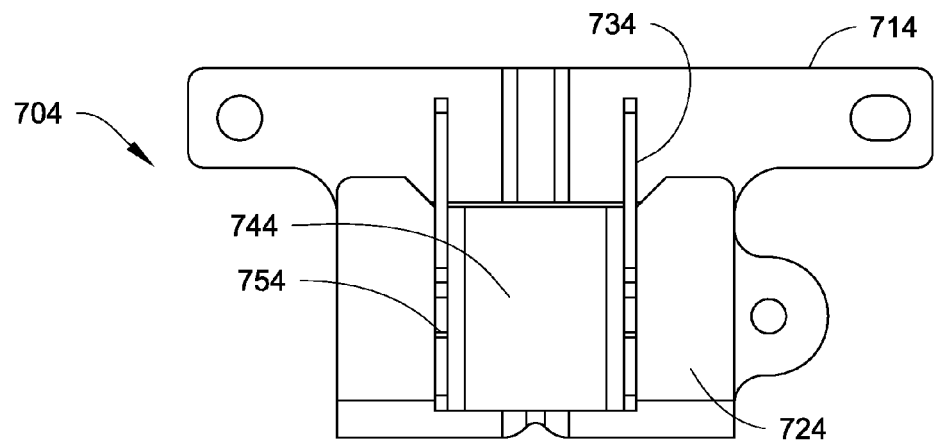
FIG. 7I is front view of the mounting bracket alone.
Figure 7J:
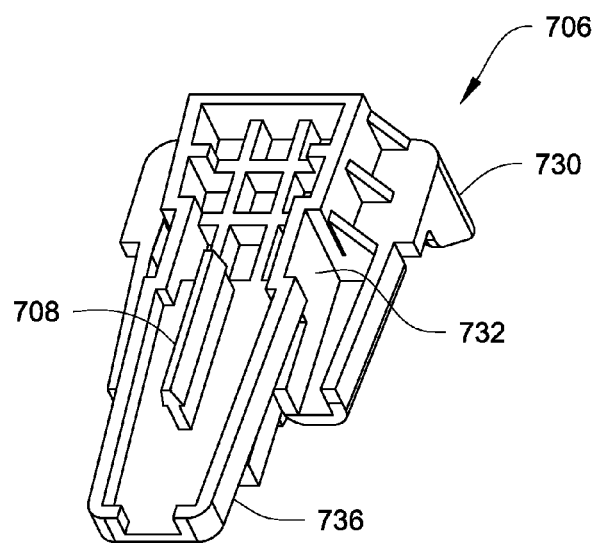
FIG. 7J is a perspective view of the retention component alone.
Figure 7K:
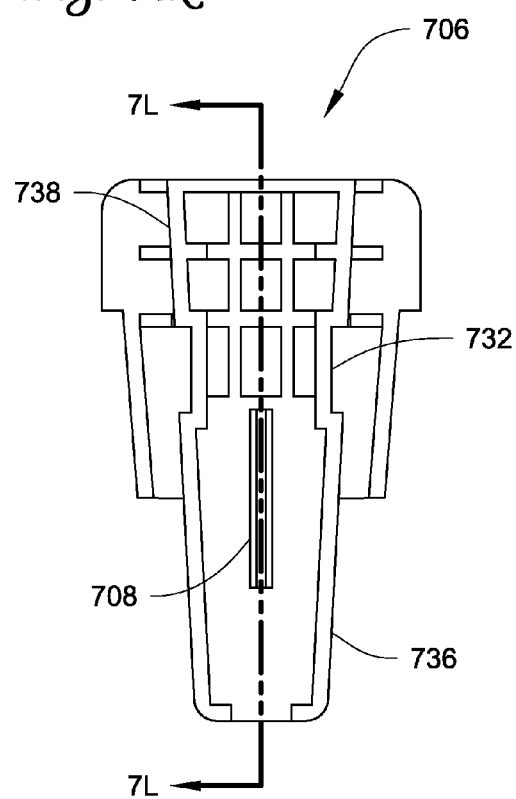
FIG. 7K is a side view of the retention component alone.
Figure 7L:
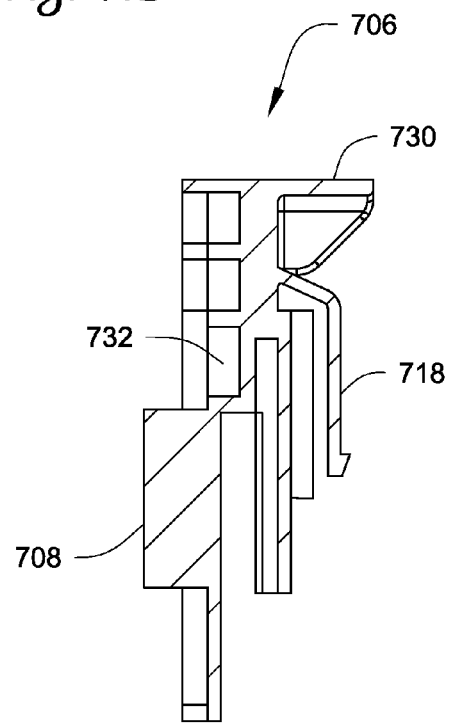
FIG. 7L is a side section view of the retention component alone.

With reference to the retention component 706, FIGS. 7J-7K show details of the retention component 706. The retention component 706 includes a handle 730 for one to grasp the retention component 706 and move it to and from the unlocked and locked positions. As shown and described above, the retention component 706 is a slidable lock retainer that pushes and moves the deflectable snap 712, 716 to and from the locked and unlocked positions under a snap fit connection.

The retention component 706 has a snap guide 736 and a snap receiver structure 732 to facilitate the snap fit connection. The snap guide 736 provides a ramp surface between the deflectable snaps 712, 716, and allows them to ride upward to the snap receiver 732. As shown, the snap guide 736 widens in an upward direction from the bottom. Since the space between the deflectable snaps 712, 716 (see e.g. FIGS. 7C and 7E) is relatively smaller than the upward portion of the snap guide 736, the snaps 712, 716 will be pushed outward, when the retention component 706 slides down with respect to the snaps 712, 716. Once the snaps 712, 716 reach the shoulder between the snap guide 736 and snap receiver 732, the snaps 712, 716 can be released from the ramp surface and reside within the snap receiver 732 in the locked position. In one embodiment, the snap receiver 732 is a notch or step that retains the snaps 712, 716. The snap receiver 732 is wider than the bottom of the snap guide 736 so that the snaps 712, 716 are pushed against the mount members 754 (see e.g. FIGS. 7A, 7B, 7M).

With further reference to the retention component 706, the retention component 706 is connected to the mounting interface 702 of the housing 720. A snap barb 708 is insertable into a groove 740 and snap slot 742 of the mounting interface 702. The snap barb 708 is slidable within the groove 740 which allows movement of the retention component relative to the mounting interface 702 (and snap 712, 716).

In some embodiments, a secondary lock may be employed. The retention component 706 may include a flexible snap 718 which engages a top plate 726 of the mounting bracket 704. The top plate 726 has an engaging portion 728 that engages the flexible snap 718. In some embodiments, the flexible snap 718 is a deflectable barbed arm that extends downwardly and outwardly from the main body of the retention component 706. The flexible snap 718 can be pushed in toward the main body to release its locked position with the engaging portion 728 of the top plate 726.

The retention component 706 may also include vertical and horizontal ribs 738 which can provide strength and reinforcement of the retention component.

Figure 7M:
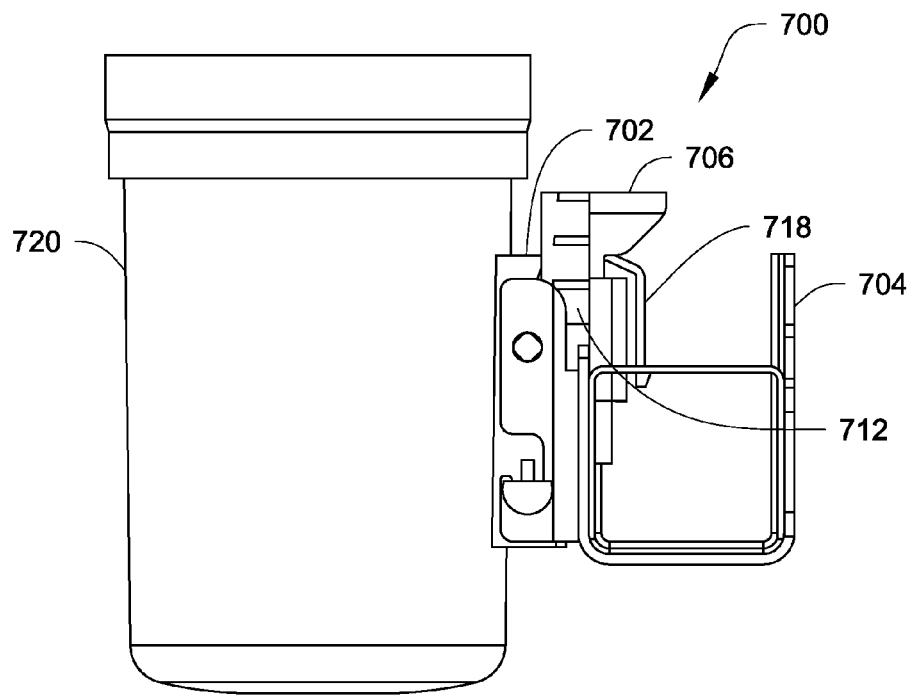
FIGS. 7M-7P shows a process of uninstalling part of a filtration module using the mounting interface, mounting bracket, and retention component.
Figure 7N:
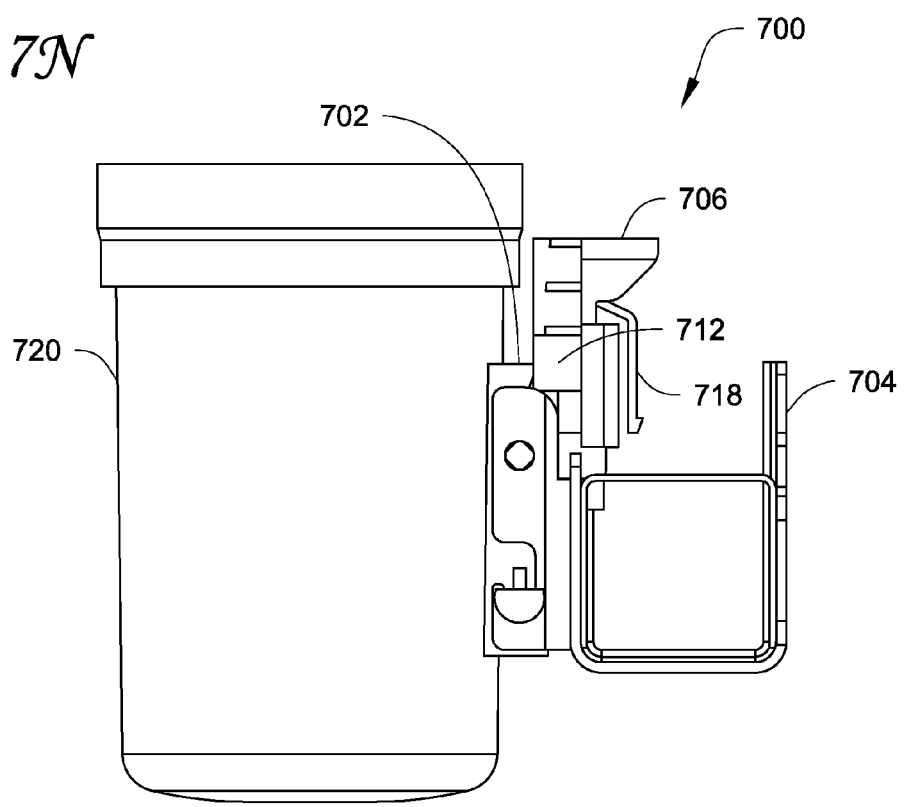
Figure 7O:
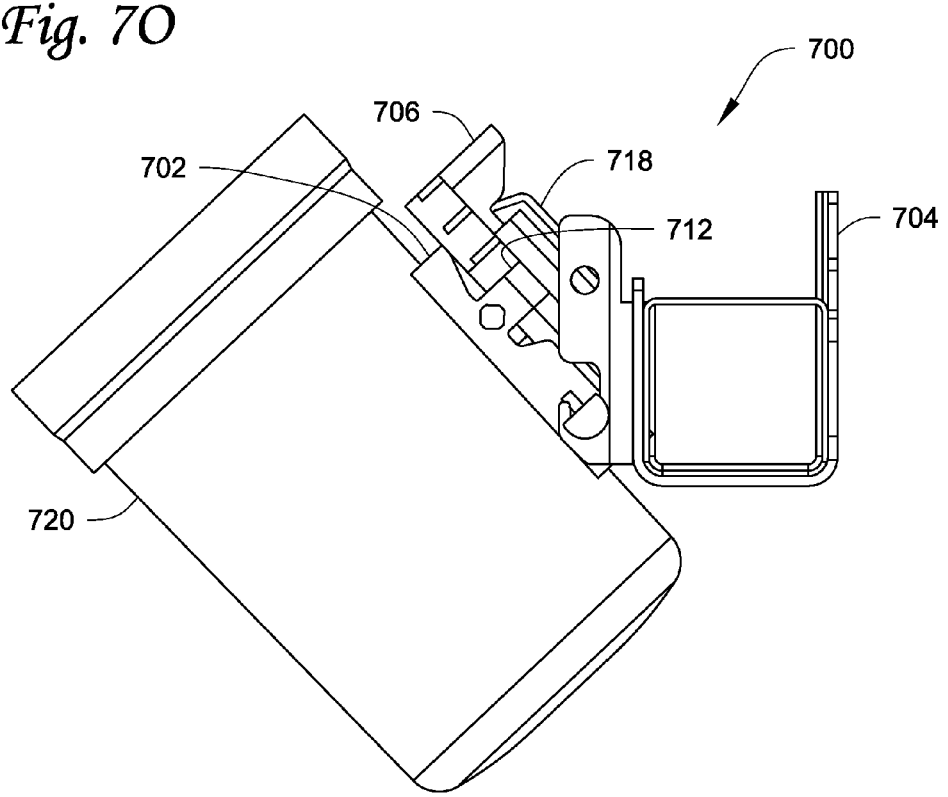
Figure 7P:
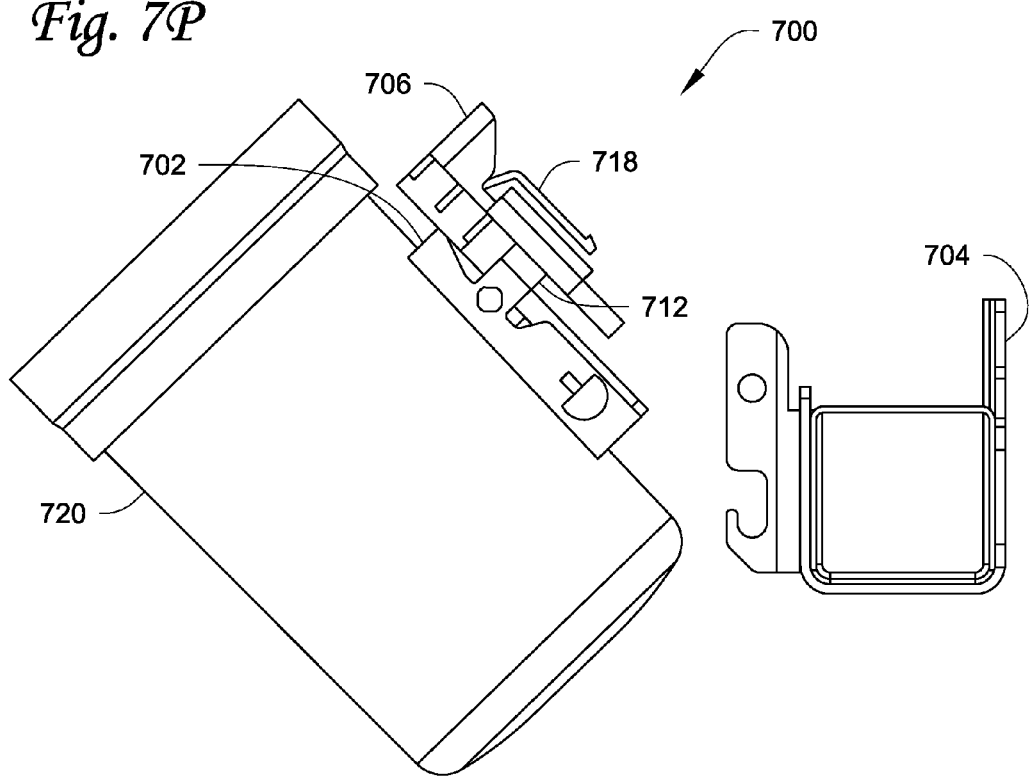

FIGS. 7M-7P show stages of disassembly or removal of the housing 720 (and mounting interface 702 and retention component 706) from the mounting bracket 704. FIG. 7M shows the attached and locked position. FIG. 7N shows the flexible snap 718 unlocked and the retention component 706 pulled up. The vertical motion of the snap guide 736 of the retention component 706 allows the snaps 712, 716 to move away from mount members 754 and out of the locked position. FIG. 7O shows that when the snaps are disengaged with the mount members 754 on the mounting bracket 704, the housing 720 and retention component 706 can be moved or tilted away from the mounting bracket 704. FIG. 7P shows that the housing 720 and retention component 706 can be removed from the mounting bracket, by moving them upward and out of the catch members. The process may be reversed to reinstall the housing 720 and retention component 706 with the mounting bracket 704. In this embodiment, the mounting bracket 704 may be discarded, while saving the housing 720 (and mounting interface 702) and retention component 706.

FIGS. 8A-8O

Figure 8L:
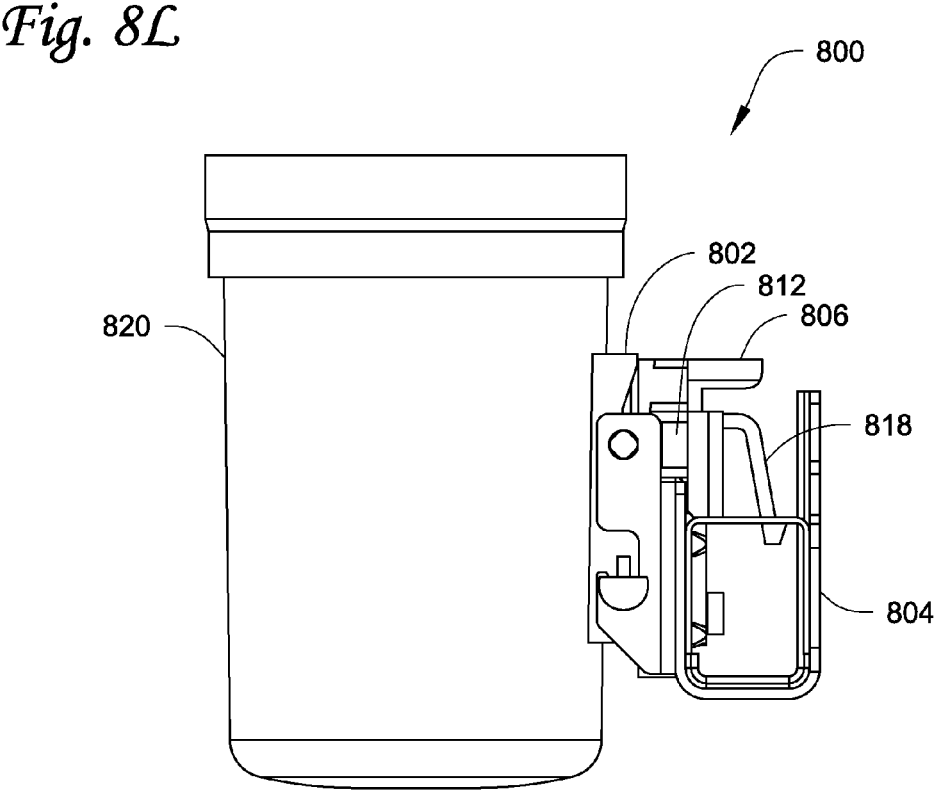
Figure 8M:
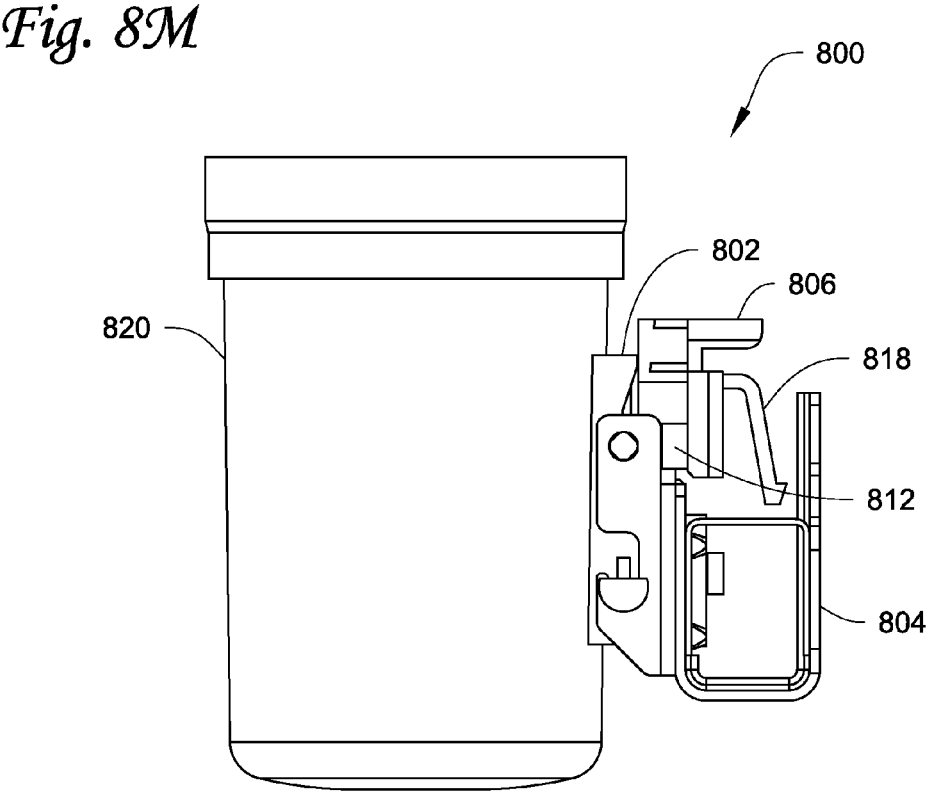
Figure 8N:
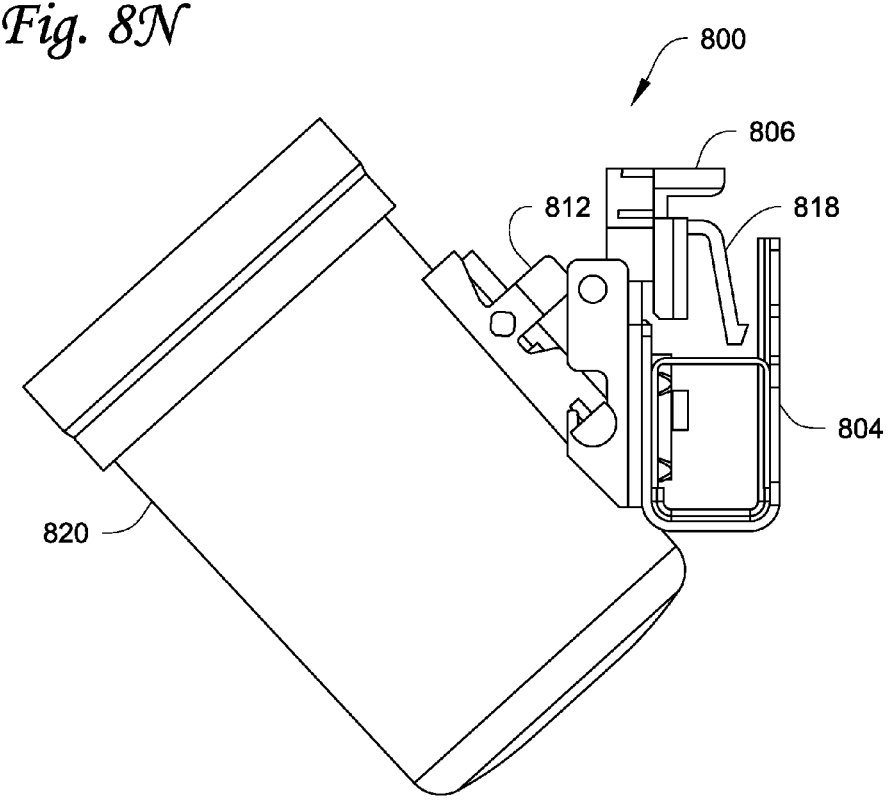
Figure 8O:
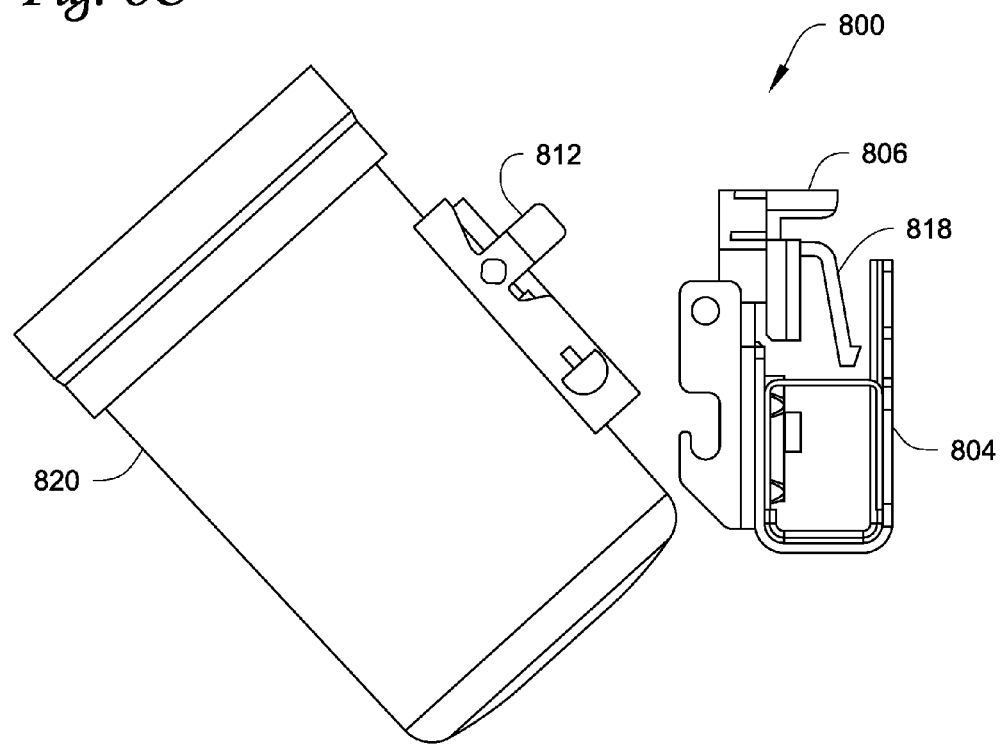

With reference to FIGS. 8A-8O, a mounting assembly 800 according to yet another embodiment is illustrated. The mounting assembly 800 provides another a tilt and snap locking interface, with a modified locking retainer structure. The modified locking retainer structure is a slidable retention component 806, but rather than being connected to the mounting interface 802, the retention component 806 is connected to the mounting bracket 804.

In the embodiment shown, the mounting interface 802 is a protruding portion. The mounting interface 802 is disposed about an outer housing or shell 820 of a filtration module, such as a fuel filter. The mounting interface 802 can be integrally molded with the housing 820 structure, which can be a composite material. In appropriate circumstances, the mounting interface 802 is not integrally molded but separately attached to the housing 820.

The mounting bracket 804 is connectable to the mounting interface 802. The mounting bracket 804, for example, has a plate 814 that faces the interface 802. Another plate 824 is connectable to another equipment, for example a vehicle body. The plate structure 814 on the side that connects with the mounting interface 802 is constructed and arranged to have an open area 844 (see e.g. FIG. 8E). Generally, the open area 844 is receivable of the protruding portion of the mounting interface 802. The open area 844 is dimensioned and sized so as to mate with a dimension of the protruding portion.

Generally, the retention component 806 retains the protruding portion of the mounting interface 802 within the open area 844 of the mounting bracket 804 in a mating engagement. Details of the retention component are further described below.

With further reference to the mounting bracket 804, the mounting bracket 804 can be constructed of a metal or composite material. In many instances, the mounting bracket 804 is metal, such as a cold rolled mild steel, and in some embodiments is constructed of material that has a lower stress margin than the interface 802. With further reference to the plate 814, the plate 814 receives the protruding portion of the interface 802 within the open area 844, which also acts as a mounting feature providing a snug fit.

With further reference to the mounting interface 802, it can have a particular reinforced configuration, and may also be constructed of a material having a higher stress margin than the mounting bracket 804. For example, the mounting interface 802 in some embodiments can be a composite material structured to have a higher stress margin at certain mounting points than the mounting bracket 804 which may be metal. The interface 802 also includes an overall thickness in its profile which gives the interface suitable stiffness and strength.

In the embodiment shown, the protruding portion of the interface 802 has a generally rectangular shaped rim constructed of vertical and horizontal walls. The mounting interface 802 and the housing 820, when formed from the same mold, can be constructed of a composite material.

The vertical walls of the rim include mounting features 812, 822 that engage with the mounting bracket 804. The mounting features 812, 822 are similar to those described with respect to FIGS. 7A-7P. In the embodiment shown, mounting feature 812 is a flexible snap, for example a barb on an arm that extends outward from the vertical wall structure of the mounting interface 802. For ease of description, the housing 820 and mounting interface 802 shown in FIGS. 8A-8C is the same as that shown in FIGS. 7J-7L (720, 702). As with the assembly 700, it will be appreciated that two flexible snaps (barbed arms 822) extend from the vertical wall structure of the mounting interface 802, one from each side. The barbed arms 812 are received by the open area 844 between the mount members 834 of the mounting bracket 804, and the barbed portions 812 engage the mount members 834. Rather than using through holes, the mounting interface 802 uses the barbed arms 812 as the primary locking structure in the snap fit connection of the mounting interface 802 (and housing 820) and the mounting bracket 804.

In one embodiment, each barbed arm 812 is a somewhat rigid structure that, when engaged with the respective mount member 834, pushes against the inner side of the mount member 834. The barbed arms can be deflected slightly inward (i.e. away from the mount member 834 of the mounting bracket), by using the retention component 806 to move the assembly from a locked to unlocked position, or from an unlocked position to a locked position (described further below).

That is, the mounting feature 812 of the mounting interface 802 is a deflectable snap that is pushable against the mount member 834 on the mounting bracket 804 in a locked position, and that is movable away from the mount member 834 in an unlocked position (see FIGS. 8L-8O further described below), where the retention component 806 is a slidable locking retainer that pushes and moves the deflectable snap to and from the locked and unlocked positions under a snap fit connection. In this embodiment, the slidable locking retainer is connected to the mounting bracket 804.

The other mounting feature 822 is one or more rests that extend outward from the vertical walls of the protruding portion of interface 802. The rests 822 can be constructed as posts configured to allow resting on a corresponding mounting feature 854 of the mounting bracket 804. In some embodiments, the rests 822 can be an extruded member, and molded along with the mounting interface 802, and of similar material. As shown, the rests 822 in some instances is a semicircular shaped extrusion with a generally flat upper and curved under, which can allow pivot and tilting action to maneuver and align connection of the interface 802 with the mounting bracket 804.

With further reference to the mounting feature 822, the rests can also restrict or at least reduce movement of the composite liquid module during operation, when engaged with the mounting bracket 804.

As further shown, the mounting features 812, 822 are respectively disposed towards the top and bottom of the interface 802. It will be appreciated that this specific configuration is not meant to be limiting and the mounting features 812, 822 can be switched if desired, or otherwise be located on the interface 802 as appropriate.

With reference to the retention component 806, FIGS. 8I-8K show details of the retention component 806. The retention component 806 includes a handle 830 for one to grasp the retention component 806 and move it to and from the unlocked and locked positions. As shown and described above, the retention component 806 is a slidable lock retainer that pushes and moves the deflectable snap 812 to and from the locked and unlocked positions under a snap fit connection.

The retention component 806 also has a snap guide 836 and a snap receiver structure 832 to facilitate the snap fit connection. The snap guide 836 provides a ramp surface between the deflectable snaps 812, and allows them to ride upward to the snap receiver 832. As shown, the snap guide 836 widens in an upward direction from the bottom. Since the space between the deflectable snaps 812, which are similar to the snaps of assembly 700 (see e.g. 712 of FIGS. 7C and 7E), is relatively smaller than the upward portion of the snap guide 836, the snaps 812 will be pushed outward, when the retention component 806 slides down with respect to the snaps 812. Once the snaps 812 reach the shoulder between the snap guide 836 and snap receiver 832, the snaps 812 can be released from the ramp surface and reside within the snap receiver 832 in the locked position. In one embodiment, the snap receiver 832 is a notch or step that retains the snaps 812. The snap receiver 832 is wider than the bottom of the snap guide 836 so that the snaps 812 are pushed against the mount members 854 (see e.g. FIGS. 8A, 8L).

With further reference to the retention component 806, the retention component 806 is connected to the mounting bracket 804, rather than the mounting interface 802. A snap barb 808 is insertable into a snap slot 840 of the mounting bracket 804. The snap barb 808 is slidable within the snap slot 840 which allows movement of the retention component 806 relative to the mounting interface 802 (and snap 812).

With further reference to the mounting bracket 804, an additional plate 810 for mounting the retention component 806 may be employed in certain circumstances. With reference to FIGS. 8D through 8H, the mounting bracket 804 includes plate 810 with snaps 842 that connect to the plate 814. The plate 810 includes the groove 840 for connecting the retention component 806 in a sliding engagement with the mounting bracket 804. It will be appreciated that the plate 810 may be formed and constructed as part of the bracket 804, rather than a separate piece as shown in the drawings.

In some embodiments, a secondary lock may be employed, similar to assembly 700. The retention component 806 may include a flexible snap 818 which engages a top plate 826 of the mounting bracket 804. The top plate 826 has an engaging portion 828 that engages the flexible snap 818. In some embodiments, the flexible snap 818 is a deflectable barbed arm that extends downwardly and outwardly from the main body of the retention component 806. The flexible snap 818 can be pushed in toward the main body to release its locked position with the engaging portion 828 of the top plate 826.

FIGS. 8L-8O show stages of disassembly or removal of the housing 820 (and mounting interface 802) from the mounting bracket 804. FIG. 8L shows the attached and locked position. FIG. 8M shows the flexible snap 818 unlocked and the retention component 806 pulled up. The vertical motion of the snap guide 836 of the retention component 806 allows the snaps 812 to move away from mount members 854 and out of the locked position. FIG. 8N shows that when the snaps are disengaged with the mount members 854 on the mounting bracket 804, the housing 820 can be moved or tilted away from the mounting bracket 804 and retention component 806. FIG. 8O shows that the housing 820 can be removed from the mounting bracket, by moving them upward and out of the catch members 854. In this embodiment, the mounting bracket 804 and retention component may be discarded, while saving the housing 820 and mounting interface 802.

FIGS. 9A-9H

With reference to FIGS. 9A-9H, a mounting assembly 900 according to yet another embodiment is illustrated. The mounting assembly 900 provides a retention component as a permanent snap on the mounting interface. The permanent snap is connectable to the mounting bracket, and avoids the use of separate, detachable fastener structures.

FIGS. 9A and 9B show views of the mounting interface 902 on a filtration housing 920 and showing the mounting interface 902 connected to a mounting bracket 904.

FIGS. 9C and 9D show the mounting interface 902 on a filtration housing 920 alone. FIG. 9E is a side view of the mounting bracket 904 alone. In the embodiment shown, the mounting interface 902 is a protruding portion. The mounting interface 902 is disposed about an outer housing or shell 920 of a filtration module, such as a fuel filter. The mounting interface 902 can be integrally molded with the housing 920 structure, which can be a composite material. In appropriate circumstances, the mounting interface 902 is not integrally molded but separately attached to the housing 920.

The mounting bracket 904 is connectable to the mounting interface 902. The mounting bracket 904, for example, has a plate 914 that faces the interface 902. Another plate 924 is connectable to another equipment, for example a vehicle body. The plate structure 914 on the side that connects with the mounting interface 902 is constructed and arranged to have an open area (similar to 744 and 844) between mown members 934. Generally, the open area is receivable of the protruding portion of the mounting interface 902. The open area is dimensioned and sized so as to mate with a dimension of the protruding portion.

Generally, the retention component retains the protruding portion of the mounting interface 902 within the open area of the mounting bracket 904 in a mating engagement. Details of the retention component are further described below.

With further reference to the mounting bracket 904, the mounting bracket 904 can be constructed of a metal or composite material. In many instances, the mounting bracket 904 is metal, such as a cold rolled mild steel, and in some embodiments is constructed of material that has a lower stress margin than the interface 902. With further reference to the plate 914, the plate 914 receives the protruding portion of the interface 902 within the open area, which also acts as a mounting feature providing a snug fit.

With further reference to the mounting interface 902, it can have a particular reinforced configuration, and may also be constructed of a material having a higher stress margin than the mounting bracket 904. For example, the mounting interface 902 in some embodiments can be a composite material structured to have a higher stress margin at certain mounting points than the mounting bracket 904 which may be metal. The interface 902 also includes an overall thickness in its profile which gives the interface suitable stiffness and strength.

In the embodiment shown, the protruding portion of the interface 902 has a generally rectangular shaped rim constructed of vertical and horizontal walls. The mounting interface 902 and the housing 920, when formed from the same mold, can be constructed of a composite material. Inner vertical and horizontal walls 938 can provide reinforcement and additional strength.

The vertical walls of the rim include mounting features 912, 922 that engage with the mounting bracket 904. In the embodiment shown, mounting feature 912 is a rigid snap, for example a barb on an arm that extends outward from the vertical wall structure of the mounting interface 902. See FIGS. 9C and 9D. As shown, two snaps 912 extend from the vertical wall structure of the mounting interface 902, one from each side. See FIG. 9D. The barbed arms 912 are received by the open area between the mount members 934 of the mounting bracket 904, and the barbed portions 912 engage a plate 926 in a permanent snap arrangement. See e.g. FIG. 9B. The mounting interface 902 uses the barbed arms 912 as the primary locking structure in the snap fit connection of the mounting interface 902 (and housing 920) and the mounting bracket 904. As the snaps 912 provide the locking function, it will be appreciated that the snaps 912 are rigid and stiff such that a large amount of force is used to connect the snaps 912 to the plate 926 on the mounting bracket 904.

The other mounting feature 922 is one or more rests that extend outward from the vertical walls of the protruding portion of interface 902. The rests 922 can be constructed as posts configured to allow resting on a corresponding mounting feature 954 of the mounting bracket 904. In some embodiments, the rests 922 can be an extruded member, and molded along with the mounting interface 902, and of similar material. As shown, the rests 922 in some instances is a semicircular shaped extrusion with a generally flat upper and curved under, which can allow pivot and tilting action to maneuver and align connection of the interface 902 with the mounting bracket 904. With further reference to the mounting feature 922, the rests can also restrict or at least reduce movement of the composite liquid module during operation, when engaged with the mounting bracket 904.

As further shown, the mounting features 912, 922 are respectively disposed towards the top and bottom of the interface 902. It will be appreciated that this specific configuration is not meant to be limiting and the mounting features 912, 922 can be switched if desired, or otherwise be located on the interface 902 as appropriate.

With reference to the retention component, the retention component is the arrangement of the barbed mounting feature 912 and the plate 926. In this embodiment, no separate, detachable fastener is used.

FIGS. 9F-9H show stages of assembly or installation of the housing 920 (and mounting interface 902 with the mounting bracket 904. FIG. 9F shows the mounting interface 902 on a filtration housing 920 just before mounting to the mounting bracket 904. FIG. 9G shows the mounting interface 902 on a filtration housing 920 partially mounted to the mounting bracket 904. FIG. 9H shows the mounting interface 902 on a filtration housing 920 mounted to the mounting bracket 904 in the attached and locked position. In this embodiment, no separate, detachable fastener is used.

Generally, the mounting assembly, and its embodiments, as described herein can provide a more robust mounting interface, such as for a composite filtration module for mounting to a metal/composite bracket. Some benefits of the designs herein include ease of assembly, minimization/ease of attachment features/components and quick installation, and cost effective designs.

It is to be realized that the concepts herein can be applied to other module applications. For example, the mounting constructions herein can be used for various filter designs, including various liquid filtration modules, such as for instance wholly or partly disposable filters, some of which may not employ the shell and cartridge designs referred to in the drawings. Likewise, the mounting constructions herein may be applied to applications that do not include filtration modules.

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A mounting assembly for mounting a filtration module, comprising:
 a mounting interface that has a protruding portion, the protruding portion has sidewalls that extend in a direction substantially perpendicular to the filtration module and a first pair of through holes that extend through the sidewalls;
 a mounting bracket connectable to the mounting interface, the mounting bracket has a plate structure that has a major surface and sidewalls that extend from opposite sides of the major surface in a direction substantially perpendicular to the filtration module, and the sidewalls have a second pair of through holes,
 one of the mounting interface and the mounting bracket has an open area between the sidewalls, the open area is received by the other of the protruding portion or plate structure, and mates with the protruding portion or plate structure; and
 a retention component connects the mounting interface and the mounting bracket, the retention component retains the protruding portion or plate structure within the open area of the other of the protruding portion or plate structure,
 wherein the first pair of through holes of the mounting interface aligns with the second pair of through holes of the mounting bracket,
 wherein the retention component is a pin that is inserted through the first pair of through holes and the second pair of through holes in a direction that is substantially parallel to the major surface of the plate structure to retain the mounting interface to the mounting bracket, and
 wherein the retention component includes a material having a lower stress margin than the mounting bracket and the mounting interface.

2. The mounting assembly of claim 1, wherein the mounting interface is constructed of a material having a higher stress margin than the mounting bracket.

3. The mounting assembly of claim 1, wherein the mounting interface is integrally molded onto a housing of the filtration module.

4. The mounting assembly of claim 1, wherein the protruding portion of the mounting interface has a rim constructed of vertical and horizontal walls.

5. The mounting assembly of claim 4, wherein the protruding portion of the mounting interface comprises a reinforcing member within the vertical and horizontal walls of the rim, the reinforcing member is at least one of additional vertical ribs, additional horizontal ribs, thickened walls, and angled ribs forming a truss-like reinforcement.

6. The mounting assembly of claim 1, wherein the mounting interface comprises at least one mounting feature configured for engagement with a corresponding mounting feature of the mounting bracket, and through the respective mounting features, the mounting interface and mounting bracket are connectable to the retention component so as to retain the mounting interface to the mounting bracket.

7. The mounting assembly of claim 6, wherein the mounting feature of the mounting interface is a rest and the corresponding mounting feature of the mounting bracket is a catch member, where the catch member is receivable of the rest to engage the mounting interface with the mounting bracket.

8. The mounting assembly of claim 7, wherein the rest is an extrusion with a generally flat upper and a curved under, and the catch member has an angular hook shape.

9. A filtration module assembly comprising:
a housing that includes
a wall structure having a generally cylindrical sidewall, a bottom wall, and a generally open top;
an inner volume within the wall structure, the inner volume configured to accommodate a filter and allow insertion through the open top; and
a mounting interface integrally molded onto an outer surface of the generally cylindrical sidewall, the mounting interface including a protruding portion extending from the outer surface, the protruding portion having sidewalls that extend in a direction substantially perpendicular to the filtration module and a first pair of through holes that extend through the sidewalls,
a mounting bracket connectable to the mounting interface, the mounting bracket having a plate structure that has a major surface and sidewalls that extend from opposite sides of the major surface in a direction substantially perpendicular to the filtration module, and the sidewalls have a second pair of through holes,
one of the mounting interface and the mounting bracket has an open area between the sidewalls, the open area is received by the other of the protruding portion or plate structure, and mates with the protruding portion or plate structure, and
a retention component connects the mounting interface and the mounting bracket, the retention component retains the protruding portion or plate structure within the open area of the other of the protruding portion or plate structure,
wherein the first pair of through holes of the mounting interface aligns with the second pair of through holes of the mounting bracket,
wherein the retention component is a pin that is inserted through the first pair of through holes and the second pair of through holes in a direction that is substantially parallel to the major surface of the plate structure to retain the mounting interface to the mounting bracket, and
wherein the retention component includes a material having a lower stress margin than the mounting bracket and the mounting interface.

* * * * *